US011909928B2

(12) United States Patent
Kanno

(10) Patent No.: US 11,909,928 B2
(45) Date of Patent: Feb. 20, 2024

(54) INFORMATION PROCESSING APPARATUS AND IMAGE PROCESSING APPARATUS THAT ENABLE PUSH SCAN, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventor: Shoichi Kanno, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/571,716

(22) Filed: Jan. 10, 2022

(65) Prior Publication Data
US 2022/0239789 A1 Jul. 28, 2022

(30) Foreign Application Priority Data
Jan. 22, 2021 (JP) .................................. 2021-008886

(51) Int. Cl.
*H04N 1/00* (2006.01)
*H04N 1/32* (2006.01)

(52) U.S. Cl.
CPC ....... *H04N 1/00214* (2013.01); *H04N 1/0023* (2013.01); *H04N 1/00228* (2013.01)

(58) Field of Classification Search
None
See application file for complete search history.

(56) References Cited

U.S. PATENT DOCUMENTS

2003/0043423 A1\* 3/2003 Johnston ............ H04N 1/32523
358/505
2010/0118344 A1\* 5/2010 Asano ................ H04N 1/00408
358/1.15
(Continued)

FOREIGN PATENT DOCUMENTS

JP 2002111953 \* 4/2002 ............... H04N 1/00
JP 2005051297 \* 2/2005 ............... H04N 1/00
(Continued)

*Primary Examiner* — Beniyam Menberu
(74) *Attorney, Agent, or Firm* — ROSSI, KIMMS & McDOWELL LLP

(57) ABSTRACT

An information processing apparatus that changes a state of a monitoring process that waits for image data from an image processing apparatus between a working state and a non-working state as necessary. The information processing apparatus includes a first transmission unit that transmits identification information about the information processing apparatus to the image processing apparatus, a reception unit that receives image data that is generated by scanning a document by the image processing apparatus and is transmitted from the image processing apparatus using the identification information, a second transmission unit that transmits the received image data to a predetermined application in the information processing apparatus, and a setting unit that sets as to whether the second transmission unit transmits the received image data to the predetermined application. The setting unit sets so as to transmit the received image data to the predetermined application based on transmission of the identification information.

4 Claims, 25 Drawing Sheets

(56) References Cited

U.S. PATENT DOCUMENTS

| | | | | |
|---|---|---|---|---|
| 2010/0141992 A1* | 6/2010 | Murase | ............... | H04N 1/00241 |
| | | | | 358/448 |
| 2010/0259799 A1 | 10/2010 | Shibao | | |
| 2015/0281496 A1* | 10/2015 | Yamamoto | ......... | H04N 1/00925 |
| | | | | 358/448 |
| 2019/0222707 A1* | 7/2019 | Nojiri | ................ | H04N 1/00917 |

FOREIGN PATENT DOCUMENTS

| | | | | |
|---|---|---|---|---|
| JP | 2010226204 | * 10/2010 | ............... | H04N 1/00 |
| JP | 2010245949 A | 10/2010 | | |
| JP | 2019068148 | * 4/2019 | ............... | H04N 1/00 |

* cited by examiner

FIG. 7A

INFORMATION PROCESSING APPARATUS --> IMAGE PROCESSING APPARATUS       701

POST /hoge/PushScanJobs HTTP/1.1
Host: 100.110.120.130
Content-Type: text/xml
<scan:ScanSettings>
　<scan:Intent>Photo</scan:Intent>
　<scan:ScanDestinations>
　　<xyz:DestinationUri>https://100.110.120.210/ScanData/20201010<xyz:DestinationUri>
　　<xyz:JobOriginatingUserName>Taro Nippon</xyz:JobOriginatingUserName>
　　<xyz:JobInfomation>PC1, Time=300<xyz:JobInfomation>
　</xyz:ScanDestinations>
</scan:ScanSettings>

FIG. 7B

702
IMAGE PROCESSING APPARATUS -> INFORMATION PROCESSING APPARATUS
HTTP/1.1 200 OK

FIG. 7C

IMAGE PROCESSING APPARATUS -> INFORMATION PROCESSING APPARATUS   703

POST /100.110.120.210 HTTP/1.1
Host: 100.110.120.210/ScnData/20201010
Authrication: Basic XYZXYZXYZ
Content-Type: image/jpeg
Content-Length: 12000
...jpeg binary data...

FIG. 7D

```
INFORMATION PROCESSING APPARATUS -> IMAGE PROCESSING APPARATUS    704

HTTP/1.1 200 OK
```

INFORMATION PROCESSING APPARATUS AND IMAGE PROCESSING APPARATUS THAT ENABLE PUSH SCAN, CONTROL METHODS THEREFOR, AND STORAGE MEDIA STORING CONTROL PROGRAMS THEREFOR

BACKGROUND OF THE INVENTION

Field of the Invention

The present invention relates to an information processing apparatus, an image processing apparatus, control methods therefor, and storage media storing control programs therefor, and in particular, relates to control in executing push scan from the image processing apparatus to the information processing apparatus.

Description of the Related Art

Pull scan and push scan are known as methods of capturing an image into image processing software that is installed in an information processing apparatus from an image processing apparatus. In the pull scan, image processing software instructs a scanner driver installed in the information processing apparatus to read an image with a scanner of the image processing apparatus that is connected to the information processing apparatus, and the image processing software receives the read image through the scanner driver. In this way, the process that the information processing apparatus as a starting point draws an image from the image processing apparatus is called the pull scan. In the meantime, in the push scan, the scanner of the image processing apparatus that is connected to the information processing apparatus reads an image, and the read image is sent to the image processing software through the scanner driver installed in the information processing apparatus. That is, the process that the image processing apparatus as a starting point pushes an image to the information processing apparatus is called the push scan.

In the case of the pull scan, since the information processing apparatus instructs the image processing apparatus to read an image, the image processing apparatus needs performing a monitoring process that always waits for an image reading instruction from the information processing apparatus. Against this, in the case of the push scan, since the image processing apparatus sends the read image to the information processing apparatus, the information processing apparatus needs performing a monitoring process that always waits for an image from the image processing apparatus (for example, see Japanese Laid-Open Patent Publication (Kokai) No. 2010-245949 (JP 2010-245949A)).

Information processing apparatuses attain miniaturization and light weighting, and many of them operate with batteries. There is a demand of reducing power consumption for an information processing apparatus that operates with a battery. As a method responding to this demand with the information processing system that performs the push scan, there is a method to reduce power consumption of a CPU (system controller) by lessening the number of processes that are always operating in the information processing apparatus. The monitoring process that always waits image data from the image processing apparatus is considered as one of the processes that increase the power consumption of the CPU of the information processing apparatus. Accordingly, the information processing apparatus can reduce power consumption by halting the monitoring process.

However, when halting the monitoring process, the information processing apparatus becomes impossible to perform the push scan. Moreover, the above-mentioned publication does not describe a subject and its solution that enable the push scan without performing the monitoring process that always waits an image from the image processing apparatus.

SUMMARY OF THE INVENTION

The present invention provides an information processing apparatus that changes a state of the monitoring process that waits for image data from an image processing apparatus between a working state and a non-working state as necessary.

Accordingly, an aspect of the present invention provides an information processing apparatus that is communicable with an image processing apparatus. The information processing apparatus includes a first transmission unit configured to transmit identification information about the information processing apparatus to the image processing apparatus, a reception unit configured to receive image data that is generated by scanning a document by the image processing apparatus and is transmitted from the image processing apparatus using the identification information, a second transmission unit configured to transmit image data received by the reception unit to a predetermined application in the information processing apparatus, and a setting unit configured to set as to whether the second transmission unit transmits the image data received by the reception unit to the predetermined application. The setting unit sets, based on transmission of the identification information by the first transmission unit, so that the second transmission unit transmits the image data received by the reception unit to the predetermined application.

According to the present invention, the information processing apparatus that changes a state of the monitoring process that waits for image data from an image processing apparatus between a working state and a non-working state as necessary can be provided.

Further features of the present invention will become apparent from the following description of exemplary embodiments with reference to the attached drawings.

BRIEF DESCRIPTION OF THE DRAWINGS

FIG. 7A, FIG. 7B, FIG. 7C, and FIG. 7D are views showing examples of data that are exchanged between the information processing apparatus and the image processing apparatus.

DESCRIPTION OF THE EMBODIMENTS

Figure 1:
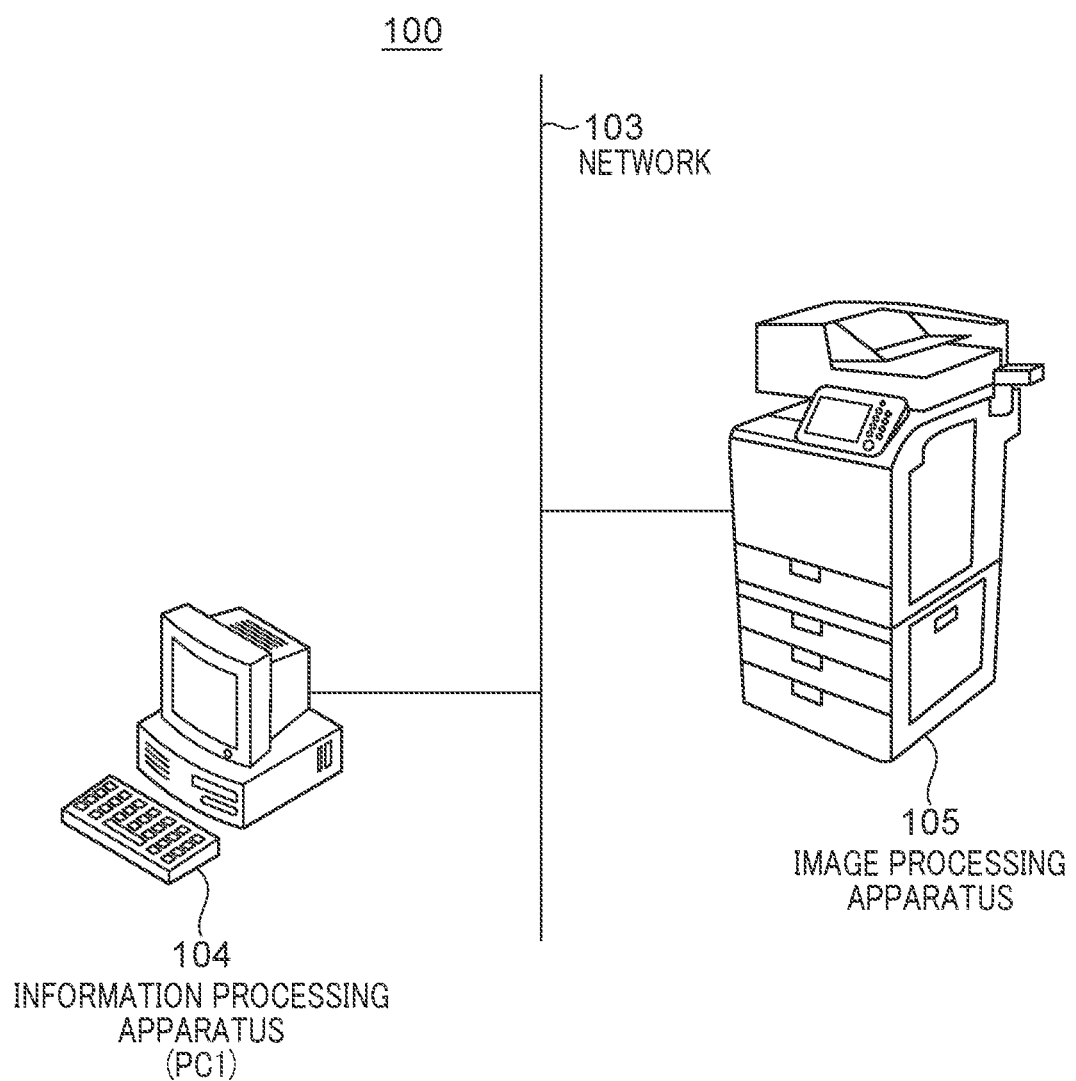
FIG. 1 is a view schematically showing a configuration of an information processing system according to an embodiment of the present invention.

Hereafter, embodiments according to the present invention will be described in detail by referring to the drawings. FIG. 1 is a view schematically showing a configuration of an information processing system 100 according to an embodiment of the present invention. The information processing system 100 has an information processing apparatus 104 and an image processing apparatus 105 that are communicably connected through a network 103.

The information processing apparatus 104 and the image processing apparatus 105 may be connected via wired connection or wireless connection. The information processing apparatus 104 transmits a pull scan job that requests scan of an image from the image processing apparatus 105. The image processing apparatus 105 can transmit a push scan job that requests receipt of a scanned image from the information processing apparatus 104. The push scan job includes image data that is generated by scanning an image of a document with the image processing apparatus 105.

Figure 2:
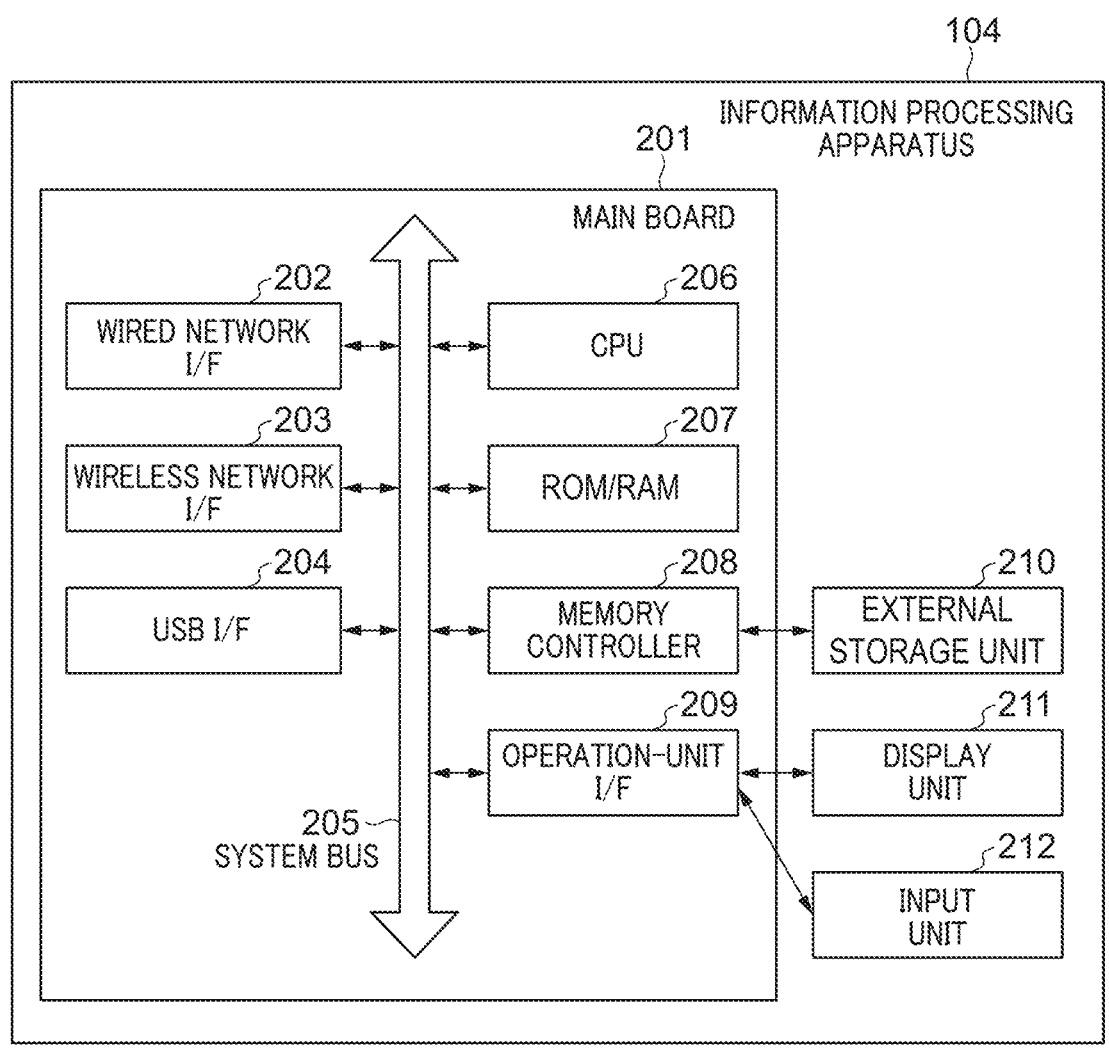
FIG. 2 is a block diagram showing a hardware configuration of an information processing apparatus shown in FIG. 1.

A schematic configuration of the information processing apparatus 104 will be described first. FIG. 2 is a block diagram showing a hardware configuration of the information processing apparatus 104. The information processing apparatus 104 may be a personal computer (PC) of a laptop type or a desktop type, and may be a portable terminal, such as a smart phone or a tablet PC.

The information processing apparatus 104 has a wired network interface (I/F) 202, a wireless network interface 203, and a USB interface 204 that are implemented in a mainboard 201. Moreover, the information processing apparatus 104 has a system bus 205, a CPU 206, a ROM/RAM 207, a memory controller 208, and an operation-unit interface 209 that are implemented in the mainboard 201. Furthermore, the information processing apparatus 104 has an external storage unit 210, a display unit 211, and an input unit 212.

The mainboard 201 is a control substrate of the information processing apparatus 104. The wired network I/F 202 controls communication of the wired communication network represented by the Ethernet. The wireless network I/F 203 controls wireless communication (Wi-Fi (registered trademark) communication) mainly based on IEEE802.11 series. Moreover, the wireless network I/F 203 functions as an interface of a mobile communication system like LTE or 5G.

The information processing apparatus 104 can communicate with an apparatus on the network 103, such as an intracompany network or the Internet, through the wired network I/F 202 or the wireless network I/F 203. Moreover, the information processing apparatus 104 can directly access to the Internet that is an example of the network 103 through a base station of a mobile communication system with the wireless network I/F 203. The USB I/F 204 enables a connection between an external apparatus and the information processing apparatus 104 (communication between the external apparatus and the CPU 206) based on a USB standard.

The system bus 205 enables information exchange between processing blocks implemented in the mainboard 201. The CPU 206 develops control programs, such as an operating system (hereinafter referred to as an "OS") and application software, onto the ROM/RAM 207 and runs the control programs to control the entire operation of the information processing apparatus 104. The ROM/RAM 207 has a storage area that stores various kinds of programs that the CPU 206 runs and a working storage area to which a stored program is developed.

The memory controller 208 controls data transmission/reception to the external storage unit 210. The external storage unit 210 is a memory means that has an auxiliary function of the ROM/RAM 207 and stores temporary data, files, and programs, such as the OS and application software. The external storage unit 210 is a hard disk, a USB memory, an optical memory device, or the like. In this way, the hardware including the CPU 206, ROM/RAM 207, and external storage unit 210 constitutes what is called a computer.

Although the information processing apparatus 104 is configured so that the CPU 206 executes processes shown in flowcharts mentions later, the present invention is not limited to such a configuration. For example, it may be configured so that processors, memories, and storage units cooperate and execute the processes.

The operation-unit I/F 209 connects the display unit 211 and input unit 212 to the mainboard 201. The display unit 211 is a display device, such as a liquid crystal panel or an organic EL panel, and shows information to a user. The input unit 212 has operation members, such as a keyboard, a mouse, and a touch panel provided in the surface of the display unit 211, and receives a user's operation.

A schematic configuration of the image processing apparatus 105 will be described below. The image processing apparatus 105 is assumed as what is called an MFP (multi-function peripheral) in general. However, the image processing apparatus that constitutes the information processing system 100 is not limited to the MFP and may be a scanner device that is simply provided with a scanner function only.

Figure 3:
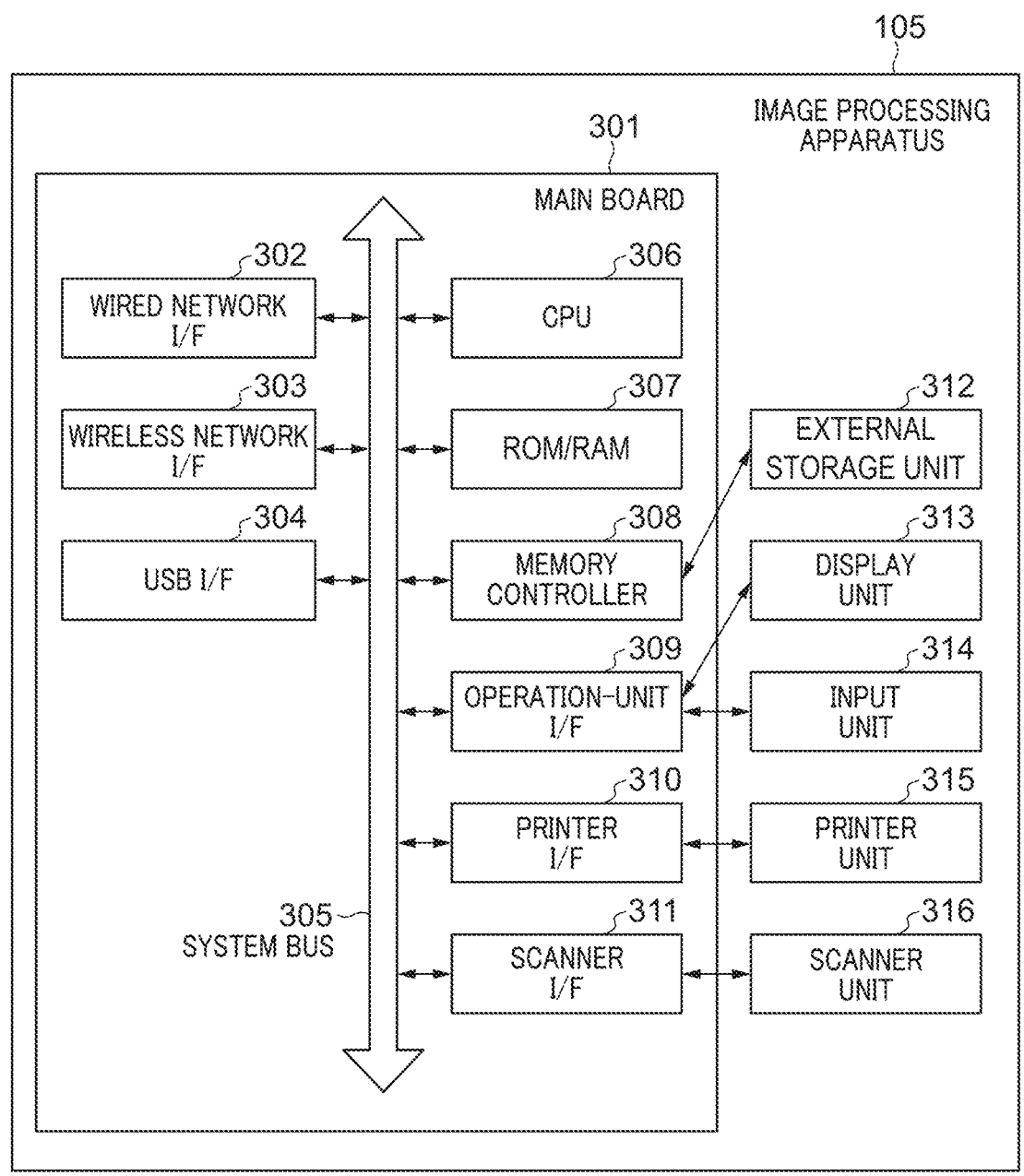
FIG. 3 is a block diagram showing a hardware configuration of an image processing apparatus shown in FIG. 1.

FIG. 3 is a block diagram showing a hardware configuration of the image processing apparatus 105. The image processing apparatus 105 has a function to read an image and provides read image data to the information processing apparatus 104 in cooperation with the information processing apparatus 104.

The image processing apparatus 105 has a wired network I/F 302, wireless network I/F 303, USB I/F 304, system bus 305, CPU 306, ROM/RAM 307, and memory controller 308 that are implemented in a mainboard 301. Moreover, the image processing apparatus 105 has an operation I/F 309, a printer I/F 310, and a scanner I/F 311 that are implemented in the mainboard 301. Furthermore, the image processing apparatus 105 has an external storage unit 312, a display unit 313, an input unit 314, a printer unit 315, and a scanner unit 316.

The mainboard 301 is a control substrate of the image processing apparatus 105. The wired network I/F 302 controls communication of a wired communication network represented by the Ethernet. The wireless network I/F 303 controls wireless communication (Wi-Fi (registered trademark) communication) mainly based on IEEE802.11 series. Moreover, the wireless network I/F 303 functions as an interface of a mobile communication system like LTE or 5G. The image processing apparatus 105 can communicate with an apparatus on the network 103, such as an intracompany network or the Internet, through the wired network I/F 302 or the wireless network I/F 303. Moreover, the image processing apparatus 105 can directly access to the Internet that is an example of the network 103 through a base station of a mobile communication system with the wireless network I/F 303. A user can change and set the network I/F used to access to the network 103 between the wired network I/F 302 and wireless network I/F 303 by using the display unit 313 and input unit 314 of the image processing apparatus 105. The USB I/F 304 enables a connection between an external apparatus and the image processing apparatus 105 (communication between the external apparatus and the CPU 306) based on the USB standard.

The system bus 305 enables information exchange between processing blocks implemented in the mainboard 301. The CPU 306 develops control programs, such as an OS and application software, onto the ROM/RAM 307 and runs the control programs to control the entire operation of the image processing apparatus 105. The ROM/RAM 307 has a storage area that stores various kinds of programs that the CPU 306 runs and a working storage area to which a stored program is developed. The memory controller 308 controls data transmission/reception to the external storage unit 312. The external storage unit 312 is a memory means that has an auxiliary function of the ROM/RAM 307 and stores temporal data, files, and programs, such as the OS and application software. The external storage unit 312 is a hard disk, a USB memory, an optical memory device, or the like.

The operation I/F 309 connects the display unit 313 and input unit 314 to the mainboard 301. The display unit 313 is a display device, such as a liquid crystal panel or an organic EL panel, and shows information to a user. The input unit 314 has operation members, such as a keyboard, a mouse, and a touch panel provided in the surface of the display unit 313, and receives a user's operation. The printer I/F 310 delivers print image data to the printer unit 315. The scanner I/F 311 receives image data from the scanner unit 316.

The printer unit 315 is what is called a printer engine and forms an image on a sheet medium (recording sheet) by a printing system, such as an electrophotographic system or an ink jet system. It should be noted that the printer unit 315 includes a double-side printing unit, a monochrome/color printing unit, a staple unit, a bookbinding unit, a trim unit, a shift sorter, sheet cassettes that store a plurality of types of recording sheets, etc. The scanner unit 316 has a document positioning plate, an image sensor that reads a document set to the document positioning plate, an ADF that automatically feeds a document, etc.

Figure 4:
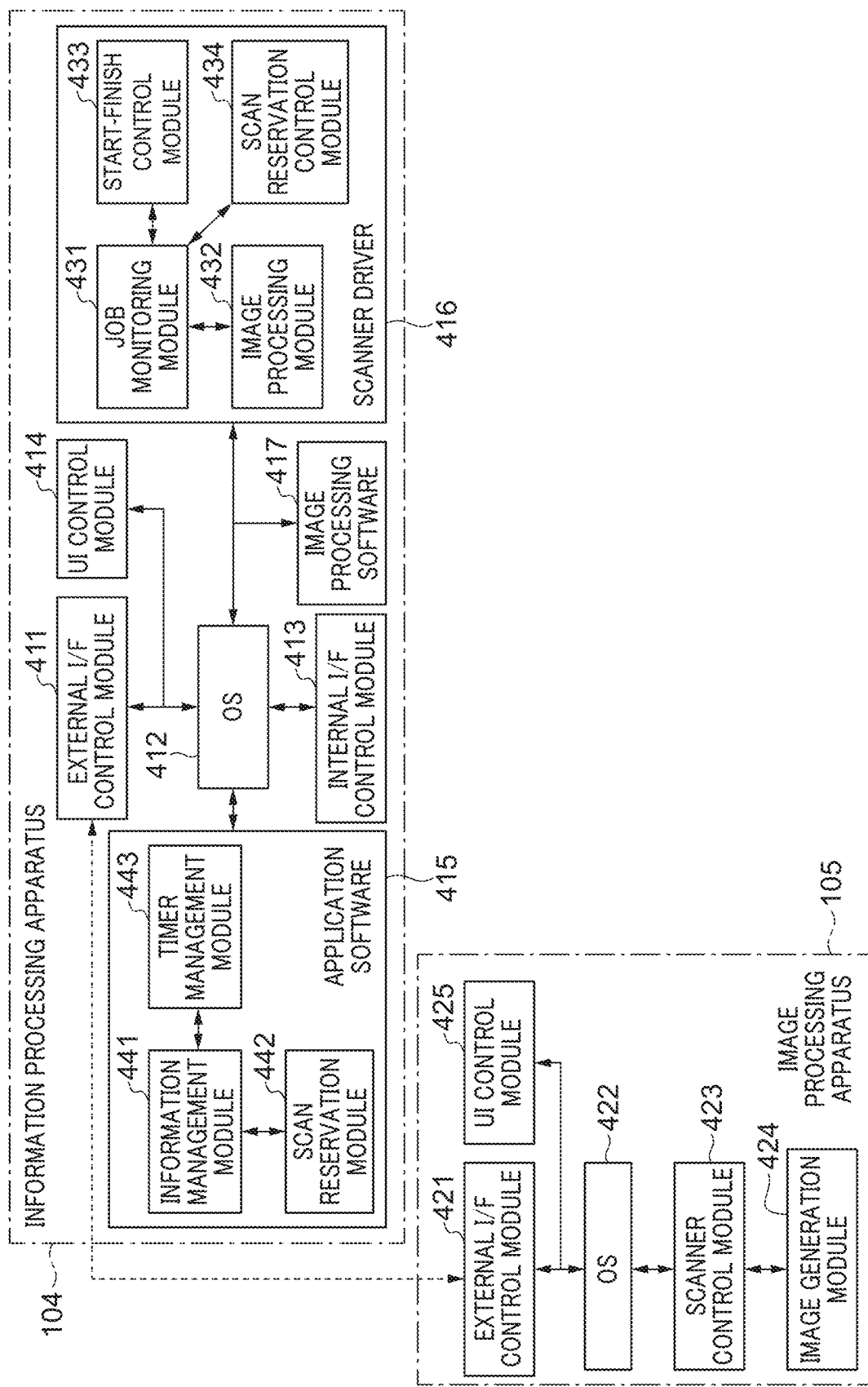
FIG. 4 is a block diagram showing software configurations of the information processing apparatus and the image processing apparatus.

Next, a software configuration in the information processing system 100 will be described. FIG. 4 is a block diagram showing software configurations of the information processing apparatus 104 and image processing apparatus 105. As shown in FIG. 4, software blocks included in the information processing apparatus 104 are mainly loaded onto the ROM/RAM 207 and operate and software blocks included in the image processing apparatus 105 are mainly loaded onto the ROM/RAM 307 and operate.

The software blocks of the information processing apparatus 104 include an external I/F control module 411, an OS 412, an internal I/F control module 413, a UI control module 414, an application software 415, a scanner driver 416, and an image processing software 417.

The external I/F control module 411 access to the image processing apparatus 105 on the network 103, a website of a vendor, a website of an OS vendor, etc. using the wired network I/F 202 or the wireless network I/F 203. Moreover, the external I/F control module 411 transmits a pull scan job to the image processing apparatus 105 and receives a push scan job from the image processing apparatus 105. It should be noted that the external I/F control module 411 holds a Mac address as information to uniquely specify itself on the network 103 and an IP address as information to dynamically identify the apparatus on the network 103.

The OS 412 is loaded onto the ROM/RAM 207 and controls the entire operations of the information processing apparatus 104 by the information exchange between the software blocks of the information processing apparatus 104 and execution control. The internal I/F control module 413 loads the OS, scanner driver 416, application software 415, image processing software 417, etc. stored in the external storage unit 210. The UI control module 414 gives information to the user of the information processing apparatus 104 using the display unit 211 and input unit 212 and receives an instruction from the user of the information processing apparatus 104.

The application software 415 includes an information management module 441, a scan reservation module 442, and a timer management module 443. The application software 415 is loaded onto the ROM/RAM 207 and operates to control a process about the push scan in this embodiment. The information management module 441 manages various kinds of information, such as address information about the image processing apparatus 105 connected to the information processing apparatus 104 on the network 103, a name and address information about the information processing apparatus 104 on the network 103, and information about a login user. Moreover, the information management module 441 controls the entire operations of the application software 415.

The scan reservation module 442 displays a push-scan reservation button on the display unit 211 and instructs the scanner driver 416 to transmit push-scan reservation information to the image processing apparatus 105 after receiving an instruction from the input unit 212. The timer management module 443 manages timer time that will be embedded to the push-scan reservation information. A user can update and set the timer time using the display unit 211 and input unit 212.

In this embodiment, the image processing software 417 is loaded onto the ROM/RAM 207 and operates so as to receive and process an image captured by the scanner driver 416. When a push scan job is executed in the image processing apparatus 105, the scanner driver 416 is loaded onto the ROM/RAM 207 and operates so as to take in the image transmitted from the image processing apparatus 105 and to deliver it to the image processing software 417. The scanner driver 416 includes a job monitoring module 431, an image processing module 432, a start-finish control module 433, and a scan reservation control module 434. The job monitoring module 431 monitors a push scan job transmitted from the image processing apparatus 105. The image processing module 432 applies processes (for example, image format conversion, color conversion, etc.) to the image data received from the image processing apparatus 105. The start-finish control module 433 controls start and finish of the process of the job monitoring module 431. The scan reservation control module 434 receives the push-scan reservation information that is sent from the application software 415 and transfers the information to the image processing apparatus 105.

The software blocks of the image processing apparatus 105 include an external I/F control module 421, an OS 422, a scanner control module 423, an image generation module 424, and a UI control module 425. The external I/F control module 421 receives a pull scan request to the image processing apparatus 105 from the information processing apparatus 104 using the wired network I/F 302 or the wireless network I/F 303. Moreover, the external I/F control module 421 sends out a push scan job and a scan image from the the image processing apparatus 105 to the information processing apparatus 104.

The OS 422 is loaded onto the ROM/RAM 307 and controls the entire operations of the image processing apparatus 105 by the information exchange between the software blocks of the information processing apparatus 104 and execution control. The image generation module 424 generates image data by controlling an operation of the scanner unit 316 so as to read a document optically. The scanner control module 423 converts the image data that the image generation module 424 obtains through the wired network I/F 302, wireless network I/F 303, or USB I/F 304 into a designated format. The UI control module 425 gives information to the user of the image processing apparatus 105 using the display unit 313 and input unit 314 and receives an instruction from the user of the image processing apparatus 105. Execution of a push scan is instructed through the UI control module 425.

Figure 5:
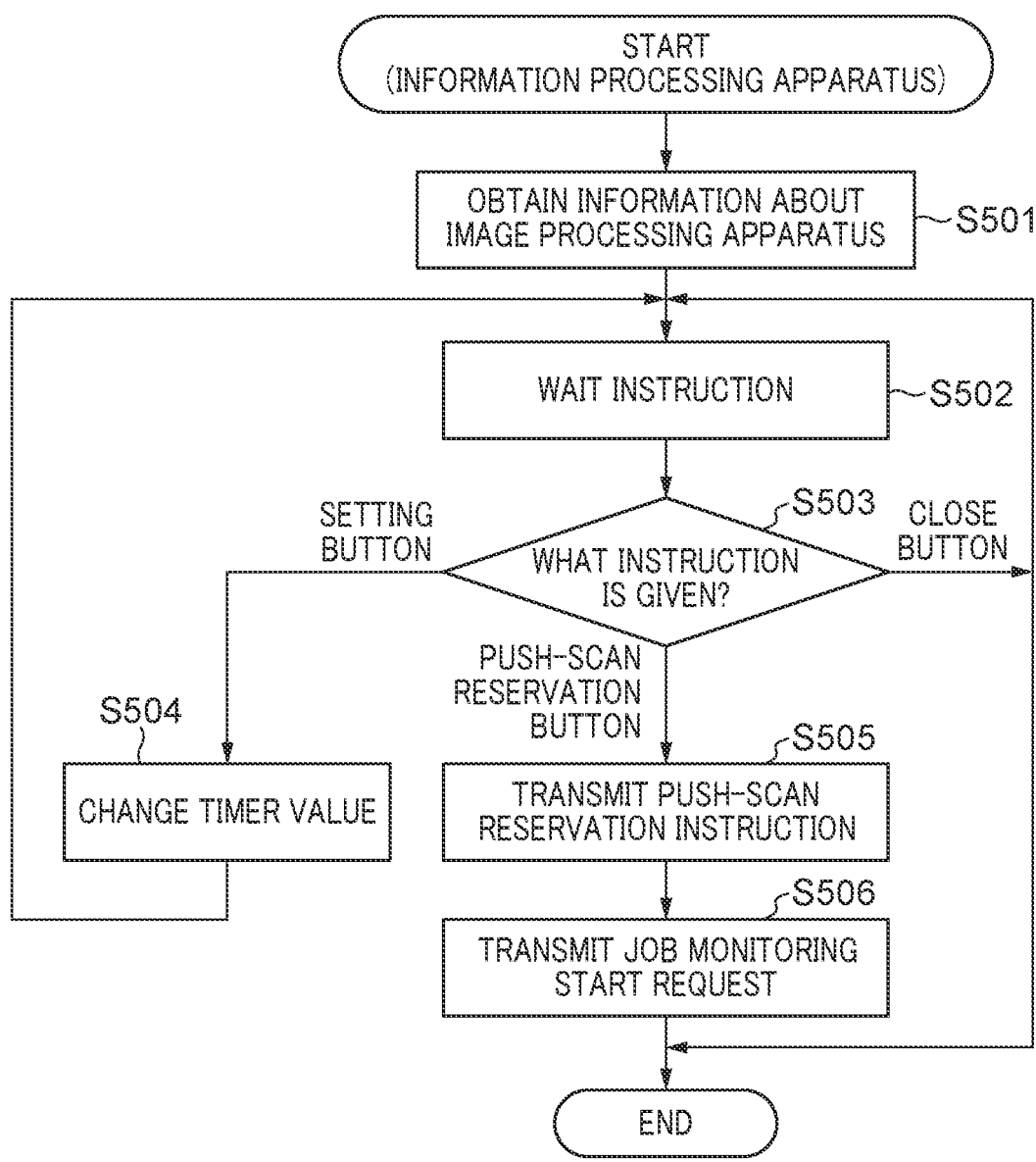
FIG. 5 is a flowchart showing a process executed in the information processing apparatus in performing a push scan job according to a first embodiment.

Next, push scan control according to the first embodiment in the information processing system 100 will be described. FIG. 5 is a flowchart showing a process executed in the information processing apparatus 104 in performing a push scan job according to the first embodiment. Each process (step) indicated by an S-number of the flowchart in FIG. 5 is achieved because the CPU 206 develops the application software 415 stored in the external storage unit 210 onto a RAM of the ROM/RAM 207 and controls an operation of each part of the information processing apparatus 104.

The user of the information processing system 100 operates the input unit 212 of the information processing apparatus 104 and instructs the CPU 206 to start the application software 415. In response to the instruction, the CPU 206 loads the application software 415 onto the ROM/RAM 207 and runs it on the OS 412. Thereby, this process is started. It should be noted that a process achieved by the CPU 206 that functions as the information management module 441 among the processes of the flowchart in FIG. 5 is described assuming that an execution subject is the information management module 441.

In S501, the information management module 441 obtains and checks the address information about the image processing apparatus 105 that is communicably connected with the information processing apparatus 104 on the network 103 through the external I/F control module 411. In S502, the information management module 441 displays a push-scan setting screen on the display unit 211 through the UI control module 414 and waits for an instruction (input) from the user of the information processing apparatus 104.

Figure 6A:
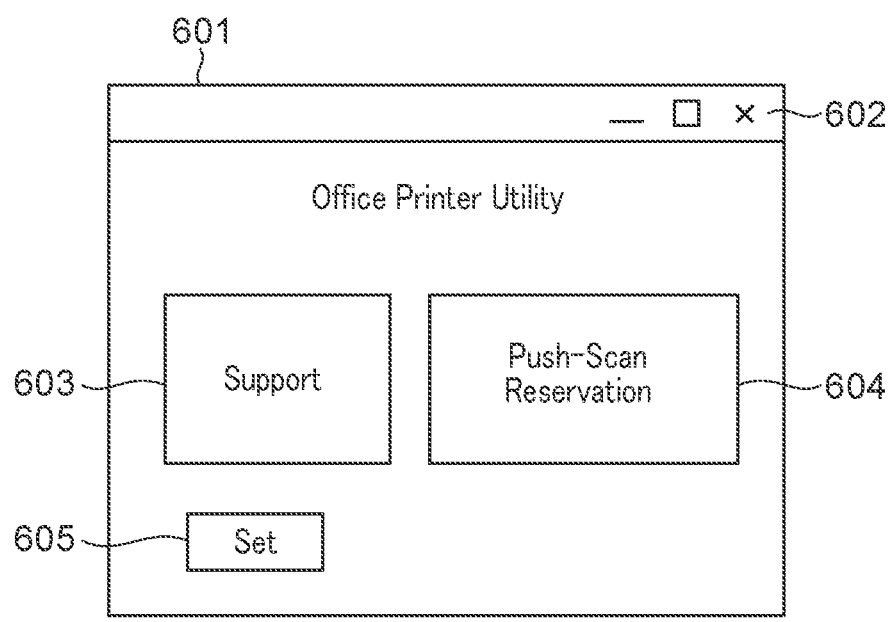
FIG. 6A and FIG. 6B are views showing screen examples that are respectively displayed in S502 and S504 in FIG. 5.

FIG. 6A is a view showing an example of the push-scan setting screen 601 displayed on the display unit 211 in S502. The push-scan setting screen 601 includes a close button 602, support button 603, push-scan reservation button 604, and set button 605. When the close button 602 is selected, the push-scan setting screen 601 is closed. When the support button 603 is selected, support information is displayed on the display unit 211. Since contents of the support information do not have direct relation to the present invention, description of the contents is omitted. When the push-scan reservation button 604 is selected, the push-scan reservation information is sent out to the image processing apparatus 105. When the set button 605 is selected, a timer setting screen is displayed on the display unit 211.

In S503, the information management module 441 causes a branch of the process according to an instruction input by a user's operation on the push-scan setting screen 601 through the UI control module 414.

Figure 6B:
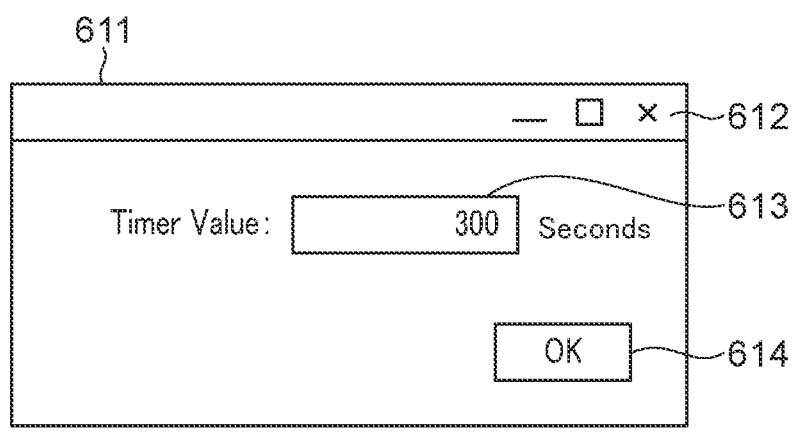

When determining that the set button 605 is pressed on the push-scan setting screen 601, the information management module 441 proceeds with the process to S504. In S504, the CPU 206 functions as the timer management module 443, displays the timer setting screen on the display unit 211, and waits for an instruction (input) from the user of the information processing apparatus 104. FIG. 6B is a view showing an example of the timer setting screen 611 displayed on the display unit 211 in S504. The timer setting screen 611 includes a close button 612, a timer value column 613, and an OK button 614.

A timer value shows a period between the start of the job monitoring process for receiving a push scan job and the automatic finish of the activation state. The timer value is set to a value obtained by adding a certain margin to a period between a time when the user reserves the push scan to the information processing apparatus 104 and a time when the user who goes to the image processing apparatus 105 and sets a document to the image processing apparatus 105 transmits the push scan job, for example. An example where "300 seconds" is input into the timer value column 613 is shown in FIG. 6B. When the OK button 614 is pressed in this state, the timer value is set to "300 seconds". After that, the timer setting screen 611 is closed automatically and the push-scan setting screen 601 is displayed.

When the close button 612 is selected, the timer setting screen 611 is closed and the push-scan setting screen 601 is displayed without setting (updating) the timer value to the value input into the timer value column 613. In this way, after the process in S504 is completed, the CPU 206 returns the process to S502.

When determining that the push-scan reservation button 604 is pressed on the push-scan setting screen 601, the information management module 441 proceeds with the process to S505. In S505, the information management module 441 transmits a push-scan reservation instruction to the scan reservation module 442. When receiving the push-scan reservation instruction, the scan reservation module 442 transmit push-scan reservation information to the scan reservation control module 434. As mentioned later, the scan reservation control module 434 transfers the received push-scan reservation information to the image processing apparatus 105 (S811 of the flowchart in FIG. 8B). The CPU 206 proceeds with the process to S506 after the process in S505.

FIG. 7A and FIG. 7B are views showing examples of data that are exchanged by http communication between the information processing apparatus 104 and the image processing apparatus 105 in S505. FIG. 7A is a view showing an example of the push-scan reservation information 701 transmitted to the image processing apparatus 105 from the information processing apparatus 104. The push-scan reservation information 701 includes a user name, the timer value (Time=300), an IP address that is identification information about the information processing apparatus 104, etc. FIG. 7B is a view showing an example of a reply 702 to the push-scan reservation information 701. The replay 702 is transmitted to the information processing apparatus 104 from the image processing apparatus 105. It should be noted that the identification information may be a MAC address of the information processing apparatus. The image processing apparatus 105 can transmit a push scan job to the information processing apparatus 104 using the identification information.

The reply 702 includes information that the request of the push-scan reservation information 701 has been accepted. The communication between the image processing apparatus 105 and the information processing apparatus 104 is not limited to the http communication and may use another communication protocol. The push-scan reservation information 701 and reply 702 are described according to the communications protocol to be used.

When determining that the close button 602 is pressed on the push-scan setting screen 601, the information management module 441 finishes this process without changing any setting items. Although not shown in FIG. 5, when determining that the support button 603 is pressed on the push-scan setting screen 601, the information management module 441 changes the push-scan setting screen 601 to a support screen on which support information is displayed. Then, when the support screen is closed by a user's operation, the process returns to S502.

In S506, the information management module 441 transmits a job monitoring start request to the start-finish control module 433. After that, the information management module 441 finishes the own process. Thereby, the process by the application software 415 is finished.

Figure 8A:
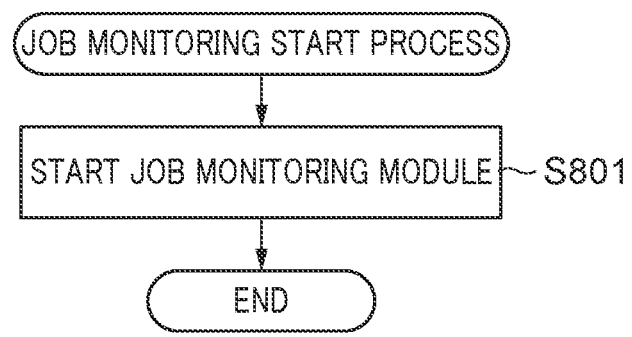
FIG. 8A is a flowchart showing a process executed in response to a start request of S506 in FIG. 5.

FIG. 8A is a flowchart showing a job monitoring start process executed in response to the job monitoring start request in S506. When the information management module 441 sends out the job monitoring start request to the start-finish control module 433 in S506, the start-finish control module 433 starts the job monitoring start process. In S801, the start-finish control module 433 starts the job monitoring module 431. After that, the start-finish control module 433 finishes the own process.

Figure 8B:
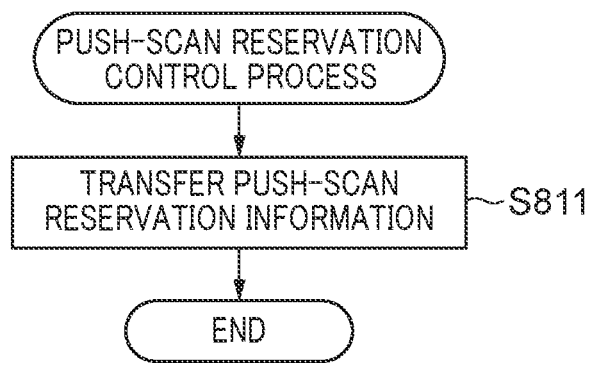
FIG. 8B is a flowchart showing a process executed in response to a reservation instruction of S505 in FIG. 5.

FIG. 8B is a flowchart showing a push-scan reservation control process executed in response to the push-scan reservation instruction in S505. Each process of the flowchart in FIG. 8B is achieved by the CPU 206 that functions as the scan reservation control module 434. In S811, the scan reservation control module 434 transfers the push-scan reservation information, which is received from the scan reservation module 442, to the image processing apparatus 105. After that, the scan reservation control module 434 finishes the own process.

Figure 8C:
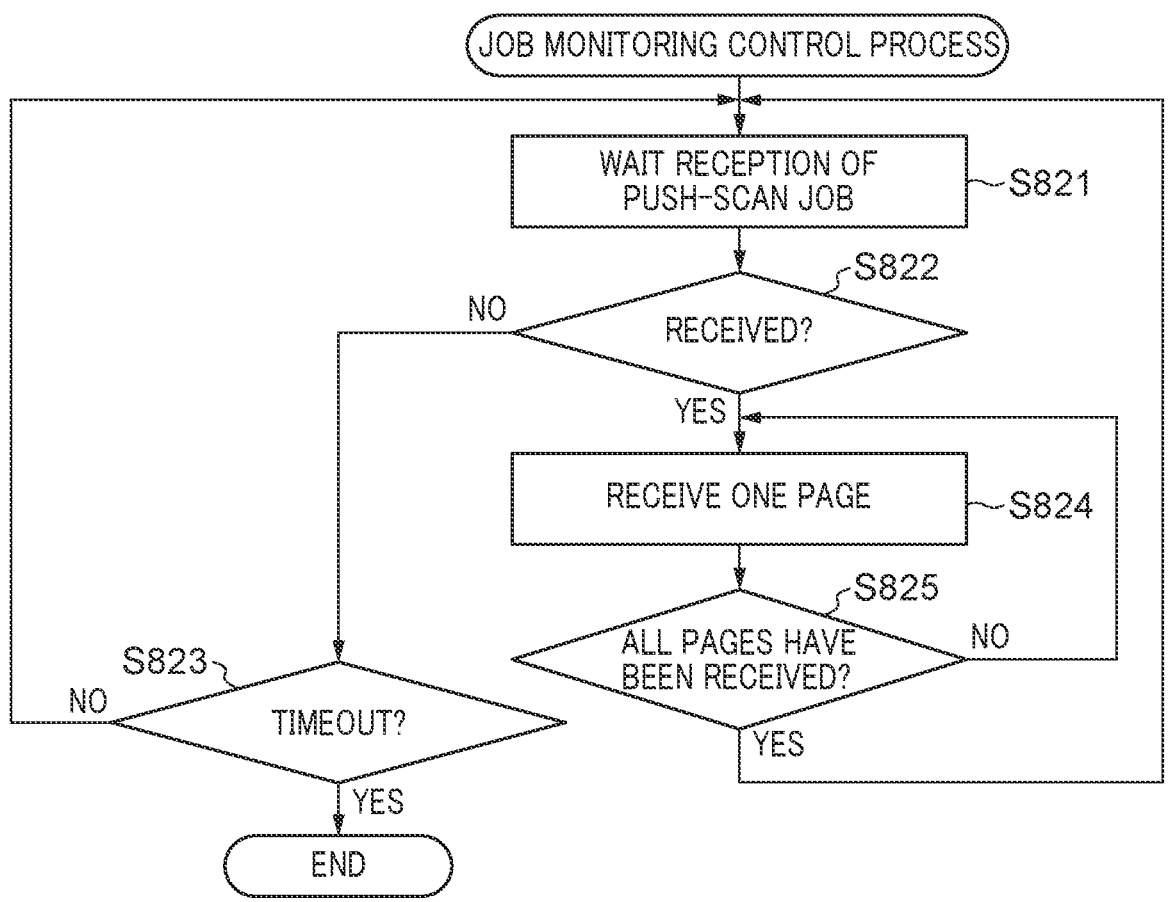
FIG. 8C is a flowchart showing a process that a job monitoring module started in S801 in FIG. 8A executes.

FIG. 8C is a flowchart showing a job monitoring control process executed by the job monitoring module 431 started in S801 in FIG. 8A. Each process of the flowchart in FIG. 8C is achieved by the CPU 206 that functions as the job monitoring module 431. When the job monitoring module 431 is started in S801, the job monitoring module 431 starts the process.

It should be noted that this embodiment assumes a work flow where the user transmits the push scan reservation to the image processing apparatus 105 from the information processing apparatus 104, goes to the image processing apparatus 105 with holding a document, sets the document, and performs the push scan. Accordingly, when the job monitoring module 431 starts the process, subtraction start time that is a variable managed on the ROM/RAM 207 is set to the current time.

In S821, the job monitoring module 431 waits for receipt of the push scan job sent out from the image processing apparatus 105. In S822, the job monitoring module 431 determines whether the push scan job is received from the image processing apparatus 105. When determining that the push scan job is not received (NO in S822), the job monitoring module 431 proceeds with the process to S823. When determining that the push scan job is received (YES in S822), the job monitoring module proceeds with the process to S824.

In S823, the job monitoring module 431 determines whether the timeout occurs by comparing the current time and the time that is obtained by adding the timer value to the subtraction start time. When the current time does not exceed the time that is obtained by adding the timer value to the subtraction start time, the job monitoring module 431 determines that the timeout does not occur. In the reverse case, the job monitoring module 431 determines that the timeout occurs. When determining that the timeout does not occur (NO in S823), the job monitoring module 431 returns the process to S821. When determining that the timeout occurs (YES in S823), the job monitoring module 431 finishes this process. That is, the job monitoring module 431 stops the operation at the timing at which the timeout occurs. When it is determined that the timeout occurs in S823, the information processing apparatus 104 does not receive the push scan job from the image processing apparatus 105 until the job monitoring module 431 starts next time. That is, even if the push scan job is received from the image processing apparatus 105, the information processing apparatus 104 disregards it when the job monitoring module 431 is not started. Specifically, when the job monitoring module 431 is started, the information processing apparatus 104 transmits the image data included in the received push scan job to a predetermined application. As a result of this, the user can process the received image data on the predetermined application. Moreover, when the job monitoring module 431 is not started, the information processing apparatus 104 does not transmit the image data included in the received push scan job to the predetermined application. When the job monitoring module 431 is not started, the information processing apparatus 104 may not receive a push scan job.

As mentioned above, the information processing apparatus 104 can be set up so as to transmit the received image data to the predetermined application by starting the job monitoring module 431 by the start-finish control module 433. Moreover, the information processing apparatus 104 can be set up so as not to transmit the received image data to the predetermined application by stopping the job monitoring module 431.

In S824, the job monitoring module 431 receives the image data of one page in the push scan job. In S825, the job monitoring module 431 determines whether the image data of all the pages in the push scan job have been received. When there are image data of two or more pages, the image data of the number of pages are transmitted from the image processing apparatus 105, and a job end signal is included in the image data of the last page. When determining that the job end signal is received, the job monitoring module 431 determines that the image data of all the pages have been received. When determining that the image data of not all the pages have been received (NO in S825), the job monitoring module 431 returns the process to S824. When determining that the image data of all the pages have been received (YES in S825), the process is returned to S821.

The above description referring to FIG. 5 through FIG. 8C shows the process executed in the information processing apparatus 104 in performing the push scan control according to the first embodiment. Next, a process executed in the image processing apparatus 105 in performing the push scan control according to the first embodiment will be described.

Figure 9A:
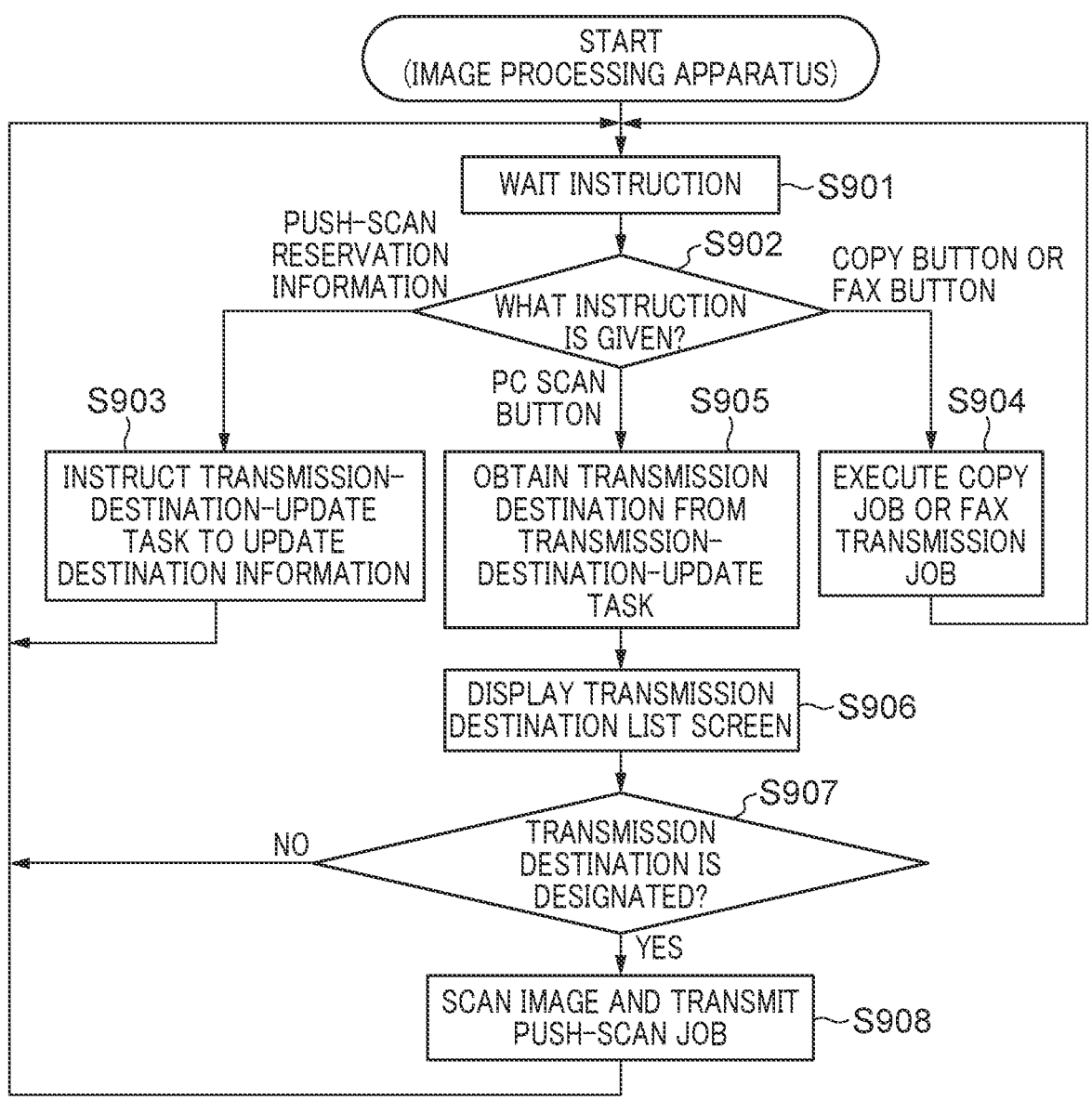
FIG. 9A is a flowchart showing a process executed in the image processing apparatus in performing the push scan job according to the first embodiment.

FIG. 9A is a flowchart showing the process executed in the image processing apparatus 105 in performing the push scan job according to the first embodiment. Each process (step) indicated by an S-number of the flowchart in FIG. 9A is achieved because the CPU 306 develops the OS 422 stored in the external storage unit 312 onto a RAM of the ROM/RAM 307 and controls an operation of each part of the image processing apparatus 105.

Figure 9B:
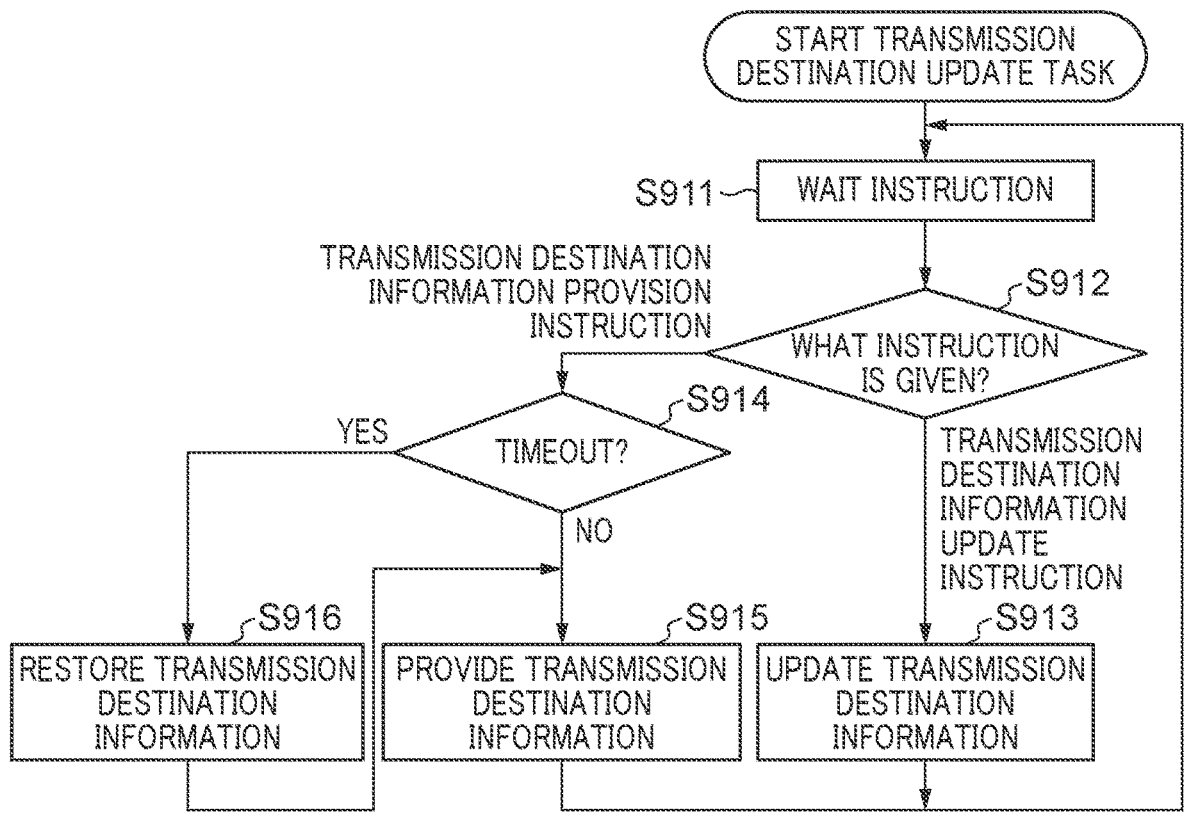
FIG. 9B is a flowchart showing a transmitting-destination information update process executed in response to an instruction in S903 in FIG. 9A.

When electric power is applied to the image processing apparatus 105, the CPU 306 develops the OS 422 stored in the external storage unit 312 to the RAM of the ROM/RAM 307 and starts the image processing apparatus 105. When the electric power is applied to the image processing apparatus 105 and the OS 422 is executed, a push scan transmission destination update task (hereinafter, referred to as a "transmission-destination-update task") mentioned later is started automatically (FIG. 9B). In the description, the OS 422 is described as an execution subject of each process (step) of the flowchart in FIG. 9A.

Figure 10A:
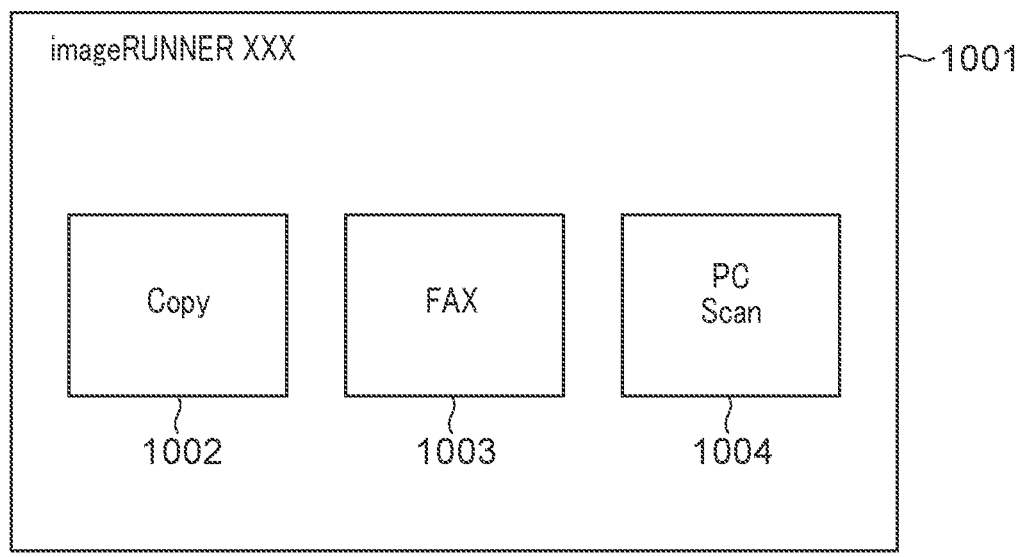
FIG. 10A is a view showing a screen example displayed in S901 in FIG. 9A.

When the image processing apparatus 105 is started, the OS 422 displays a menu screen on the display unit 313 in S901 and waits for an instruction (input) from the user of the image processing apparatus 105. FIG. 10A is a view showing an example of the menu screen 1001 displayed on the display unit 313 in S901. The menu screen 1001 includes a copy button 1002, FAX button 1003, and PC scan button 1004.

In S902, the OS 422 causes a branch of the process according to an operation of the user on the menu screen 1001 and an instruction from the information processing apparatus 104 When receiving the push-scan reservation information transmitted from the information processing apparatus 104, the OS 422 proceeds with the process to S903. In S903, the OS 422 instructs the transmission-destination-update task to update the push scan transmission-destination information (hereinafter referred to as "transmission-destination information") displayed on the display unit 313 on the basis of the push-scan reservation information received through the network 103. The OS 422 returns the process to S901 after the process in S903 is completed.

When determining that the copy button 1002 or the FAX button 1003 is pressed, the OS 422 proceeds with the process to S904. In S904, the OS 422 executes the job (a copy job or a facsimile transmission job) corresponding to the pressed button and returns the process after finishing the job.

When determining that the PC scan button 1004 is pressed, the OS 422 proceeds with the process to S905. In S905, the OS 422 instructs the transmission-destination-update task to provide the transmission-destination informa-tion of the present time and obtains the transmitting-destination information. Then, in S906, the OS 422 displays a transmission destination list screen showing the transmitting-destination information on the display unit 313 and waits for an instruction (input) from the user of the image processing apparatus 105.

Figure 10B:
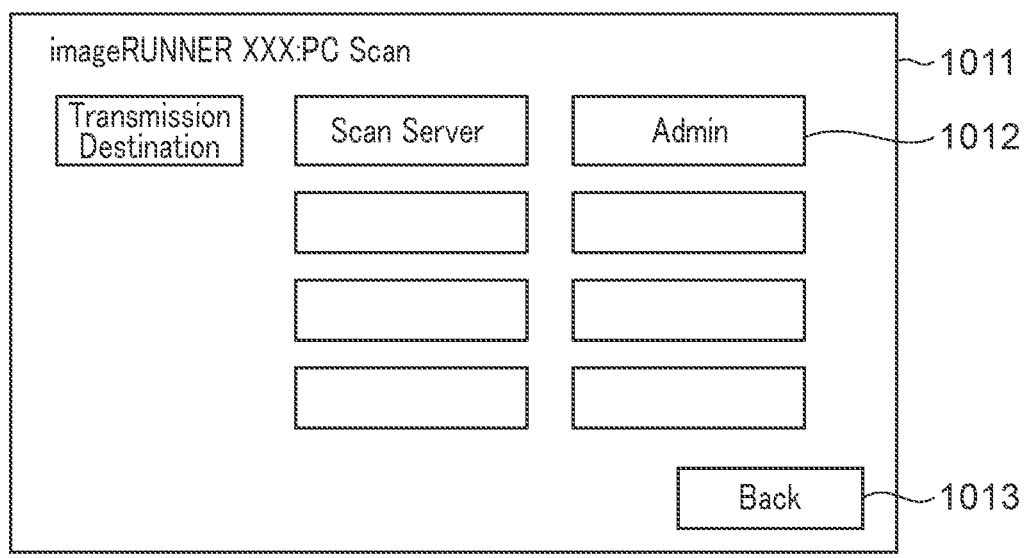
FIG. 10B and FIG. 10C are views showing screen examples displayed in S906 in FIG. 9A.
Figure 10C:
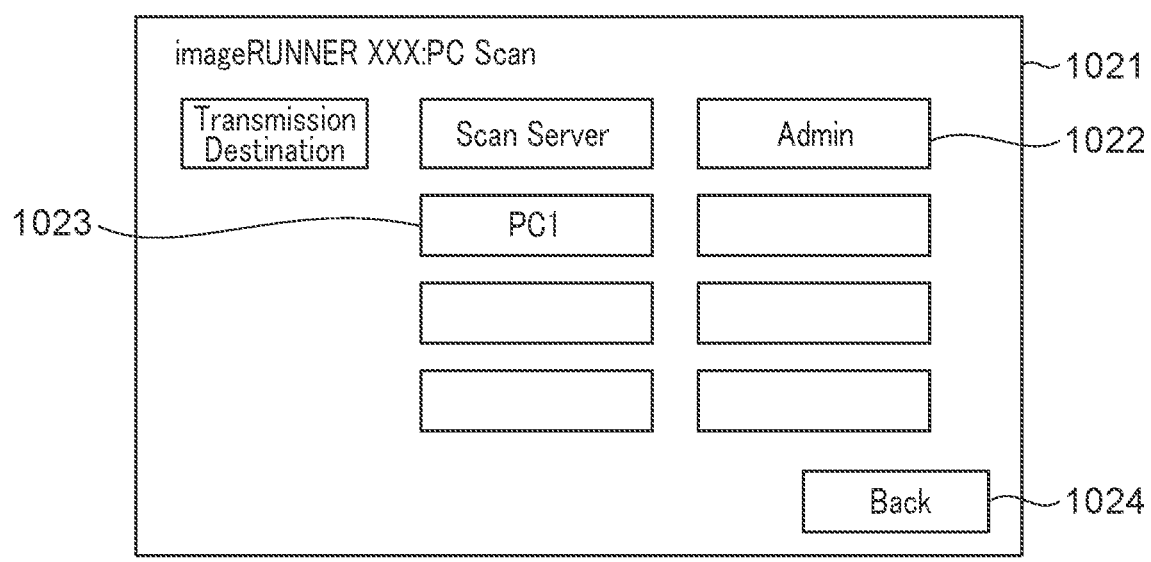

FIG. 10B and FIG. 10C are views showing examples of transmission destination list screens 1011 and 1021 displayed on the display unit 313 in S906, respectively. In the transmission destination list screen 1011 in FIG. 10B, Admin is only one information processing apparatus that can be selected as a transmission destination. In the meantime, in the transmission destination list screen 1021 in FIG. 10C, the Admin and PC1 are two information processing apparatuses that can be selected as a transmission destination. Back buttons 1013 and 1024 in the transmission destination list screens 1011 and 1021 are pressed when the user cancels execution of the push scan (when the user does not select a transmission destination). Although the name (PC1) of the information processing apparatus 104 is displayed as a transmission destination in the transmission destination list screen 1021, the user name of the information processing apparatus 104 may be displayed in place of this. Moreover, the name and user name of the information processing apparatus 104 may be displayed together.

In S907, the OS 422 determines whether the transmission destination is designated from the transmission destination list screen. For example, when the Admin button 1012 in the transmission destination list screen 1011 is pressed, the OS 422 determines that the transmission destination is designated. When the back button 1013 is pressed, the OS 422 determines that no transmission destination is designated. Moreover, when an Admin button 1022 or a PC1 button (an icon) 1023 in the transmission destination list screen 1021 is pressed, the OS 422 determines that the transmission destination is designated. The user shall set a document to be scanned to the scanner unit 316 before designating the transmission destination.

When determining that the transmission destination is designated (YES in S907), the OS 422 proceeds with the process to S908. When determining that no transmission destination is designated (the push scan is canceled) (NO in S907), the OS 422 returns the process to S901 and shifts to a suspended state.

In S908, the OS 422 scans the document set to the scanner unit 316 and generates an image file in the format designated by the push-scan reservation information transmitted from the information processing apparatus 104. Then, the OS 422 transmits the image data generated as the push scan job to the information processing apparatus 104 and finishes a push scan process. After that, the OS 422 returns the process to S901 and shifts to the suspended state.

FIG. 7C and FIG. 7D are views showing examples of data that are exchanged by http communication between the information processing apparatus 104 and the image processing apparatus 105 in S908. FIG. 7C is a view showing an example of a push scan job 703 transmitted to the information processing apparatus 104 from the image processing apparatus 105. FIG. 7D is a view showing an example of a reply 704 that the information processing apparatus 104 transmits to the image processing apparatus 105 in response to the push scan job 703. The communication between the image processing apparatus 105 and the information processing apparatus 104 is not limited to the http communication and may use another communication protocol. The push scan job 703 and reply 704 are described according to the communications protocol to be used.

The number of the image files generated in S908 generally depends on the image format and the number of document pages. For example, one job in the JPEG format corresponds to one page and one job in the PDF format corresponds to a plurality of pages, in general. When a document of a plurality of pages is set on the ADF etc., jobs of the number of pages are transmitted in the case of the JPEG format and all the document pages are gathered into one job and transmitted in the case of the PDF format, in general. However, the transmission method is not restricted to this. Even in the case of the PDF format, one page may be transmitted as one job. In this embodiment, the OS 422 shall embed a job end signal to the last page of the job.

Next, a transmitting-destination information update process executed in response to the instruction in S903 will be described. FIG. 9B is a flowchart showing the transmission-destination information update process. As mentioned above, the transmission destination update task is automatically started, when the CPU 306 runs the OS 422 after the electric power is applied to the image processing apparatus 105. Since the CPU 306 functions as the transmission destination update task by running the OS 422, the transmission destination update task is described as the execution subject of each process (step) of the flowchart in FIG. 9B.

In S911, the transmission destination update task waits for an instruction from the outside. The instructions from the outside include the push-scan reservation information transmitted from the information processing apparatus 104 and the press of the PC scan button 1004 in the menu screen 1001 displayed on the display unit 313. In S912, the transmission destination update task determines the content of the instruction from the outside. When receiving the push-scan reservation information from the outside, the transmission destination update task determines that the transmission-destination information update process is designated and proceeds with the process to S913. Moreover, when determining that provision of the transmission-destination information is instructed because the PC scan button 1004 is pressed in the menu screen 1001, the transmission destination update task proceeds with the process to S914.

In S913, the transmission destination update task updates the transmission-destination information using the push-scan reservation information transmitted from the information processing apparatus 104. For example, after the electric power is applied to the image processing apparatus 105, the Admin shall be registered as only one transmission destination of the push scan as shown in the transmission destination list screen 1011. In this case, the push-scan reservation information 701 shall be sent to the image processing apparatus 105 from the information processing apparatus 104. In that case, the transmission destination update task generates data that defines the Admin and PC1 as two transmission destinations of the push scan job on the ROM/RAM 307 as shown in the transmission destination list screen 1011. This information is obtained in S905 and displayed on the display unit 313 in S906.

The transmission destination update task sets the transmission-destination information to a value (hereinafter referred to as "timeout time") that is obtained by adding the timer value to the time at which the push-scan reservation information is received. Then, the task stores the timeout time onto the ROM/RAM 307. Then, after updating the transmission-destination information, the transmission destination update task returns the process to S911 and waits for a next instruction.

In S914, the transmission destination update task determines whether the current time exceeds the timeout time that is held in the ROM/RAM 307. When determining that the current time does not exceed the timeout time (the timeout does not occur), the transmission destination update task proceeds with the process to S915. In S915, the transmission destination update task provides the transmission-destination information held at present in response to the obtainment of the transmission-destination information in S905 and returns the process to S911 after that.

In the meantime, when determining that the current time exceeds the timeout time (the timeout occurs), the transmission destination update task proceeds with the process to S916. Since a valid period of the transmission-destination information updated in S913 expires, the transmission destination update task deletes the transmission-destination information currently held and restores the transmission-destination information being prior to the last update of S913 in S916. Introduction of the process in S916 enables deletion of the transmission-destination information that exceeds the timeout time. Then, the transmission destination update task proceeds with the process to S915, provides the restored transmission-destination information in response to the obtainment of the transmission-destination information in S905, and returns the process to S911 after that.

In the first embodiment mentioned above, the job monitoring process that waits the push scan job by the information processing apparatus is not started automatically immediately after the electric power is applied to the information processing apparatus and is started only after the push scan reservation is performed. Then, since the information processing apparatus is running the job monitoring process even before performing the push scan from the image processing apparatus, the push scan job can be executed satisfactorily and can be completed.

Moreover, the information processing apparatus automatically stops (finishes) the job monitoring process, when the push scan job is not performed until the predetermined timeout time elapses. This enables the information processing apparatus to save power consumption and to reduce the load of the CPU 206. Furthermore, since only the information processing apparatus that is running the job monitoring process is displayed on the display unit of the image processing apparatus, an operation mistake in selecting the transmission destination of the push scan job can be reduced.

Next, push scan control according to a second embodiment in the information processing system 100 will be described. At the beginning, the control executed in the information processing apparatus 104 is described.

Figure 11:
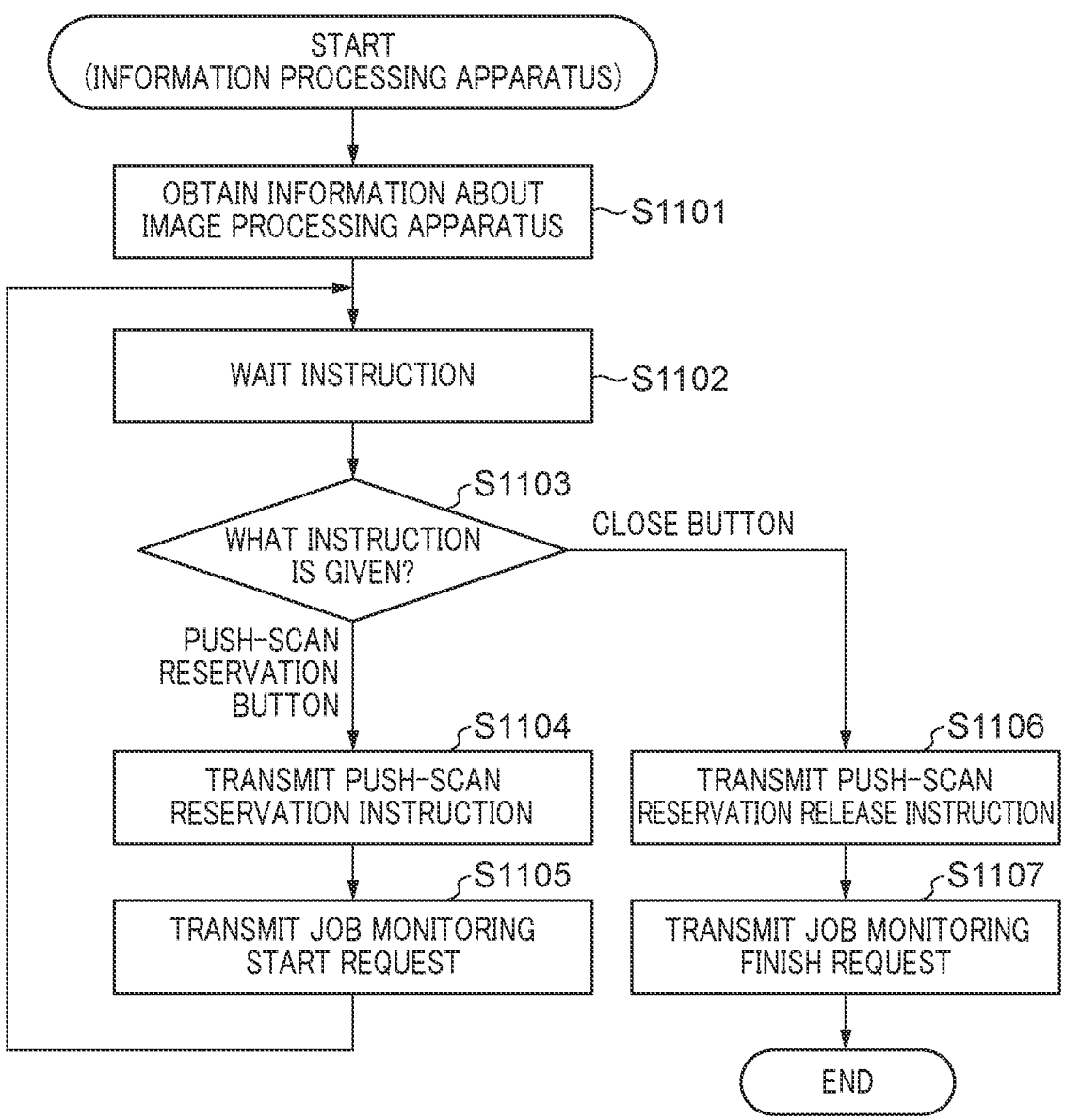
FIG. 11 is a flowchart showing a process executed in the information processing apparatus in performing a push scan job according to a second embodiment.

FIG. 11 is a flowchart showing a process executed in the information processing apparatus 104 in performing a push scan job according to the second embodiment. Each process (step) indicated by an S-number of the flowchart in FIG. 11 is achieved because the CPU 206 develops the application software 415 stored in the external storage unit 210 onto the RAM of the ROM/RAM 207 and controls an operation of each part of the information processing apparatus 104.

The user of the information processing system 100 operates the input unit 212 of the information processing apparatus 104 and instructs the CPU 206 to start the application software 415. In response to the instruction, the CPU 206 loads the application software 415 onto the ROM/RAM 207 and runs it on the OS 412. Thereby, this process is started. It should be noted that a process achieved by the CPU 206 that functions as the information management module 441 among the processes of the flowchart in FIG. 11 is described assuming that an execution subject is the information management module 441.

Since processes in S1101 and S1102 are respectively identical to the processes in S501 and S502 in the flowchart in FIG. 5, their descriptions are omitted. In S1103, the information management module 441 causes a branch of the process according to an instruction input by a user's operation on the push scan setting screen 601 through the UI control module 414. However, the setting button 605 shall not be displayed in the push-scan setting screen 601.

Although not shown in FIG. 11, when determining that the support button 603 is pressed, the information management module 441 returns the process to S1102 after displaying predetermined support information.

When determining that the push-scan reservation button 604 is pressed, the information management module 441 proceeds with the process to S1104. Since the processes in S1104 and S1105 are respectively identical to the processes in S505 and S506 in the flowchart in FIG. 5, their descriptions are omitted. However, the push-scan reservation information (for example, the push-scan reservation information 701 in FIG. 7A) that is transmitted to the image processing apparatus 105 from the information processing apparatus 104 in response to the push-scan reservation instruction in S1104 does not include the timer value. Although the entire process of the flowchart is finished when the process in S506 is finished in the first embodiment, the process is returned to S1102 when the process in S1105 equivalent to S506 is finished in the second embodiment.

When determining that the close button 602 is pressed in the push-scan setting screen 601, the information management module 441 proceeds with the process to S1106 in order to finish the application software 415. In S1106, the information management module 441 transmits a push-scan reservation release instruction to the scan reservation module 442 so as to transmit push-scan reservation release information to the scan reservation control module 434. Thereby, the scan reservation control module 434 that receives the push scan reservation release information transfers the push scan reservation release information to the image processing apparatus 105 as mention later (S1213 in FIG. 12B). In the following S1107, the information management module 441 instructs the start-finish control module 433 so as to transmit a job monitoring finish request to the job monitoring module 431, and thereby, this process is finished.

Next, the process of the start-finish control module 433 that receives the job monitoring start request in S1105 or the job monitoring finish request in S1107 and the process of the scan reservation control module 434 that receives the push-scan reservation instruction in S1104 or the push-scan reservation release instruction in S1106 will be described.

Figure 12A:
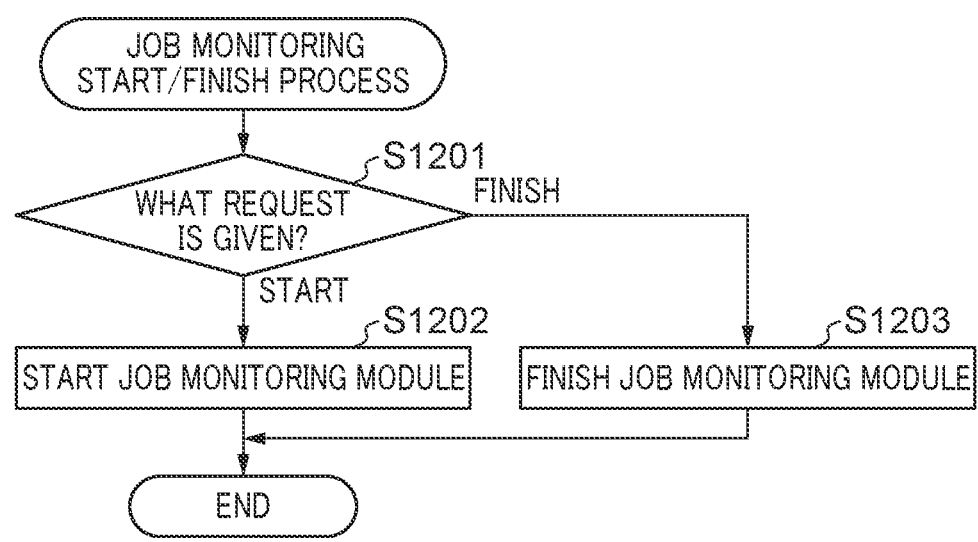
FIG. 12A is a flowchart showing a process executed in response to requests in S1105 and S1107 in FIG. 11.

FIG. 12A is a flowchart showing a job monitoring start-finish process executed in response to the job monitoring start request in S1105 or the job monitoring finish request in S1107. Each process of the flowchart in FIG. 12A is achieved by the CPU 206 that functions as the start-finish control module 433. Accordingly, the start-finish control module 433 is described as the execution subject of each process of the flowchart in FIG. 12A.

In S1201, the start-finish control module 433 checks a request content. When determining that the job monitoring start request is received, the start-finish control module 433 proceeds with the process to S1202. When determining that the job monitoring finish request is received, the start-finish control module 433 proceeds with the process to S1203. In S1202, the start-finish control module 433 starts the job monitoring module 431. The control executed by the job monitoring module 431 that is started in S1202 will be mentioned later by referring to FIG. 12C. In S1203, the start-finish control module 433 finishes the operation (control) of the job monitoring module 431. When the process in S1202 or S1203 has been executed, the start-finish control module 433 finishes this process.

Figure 12B:
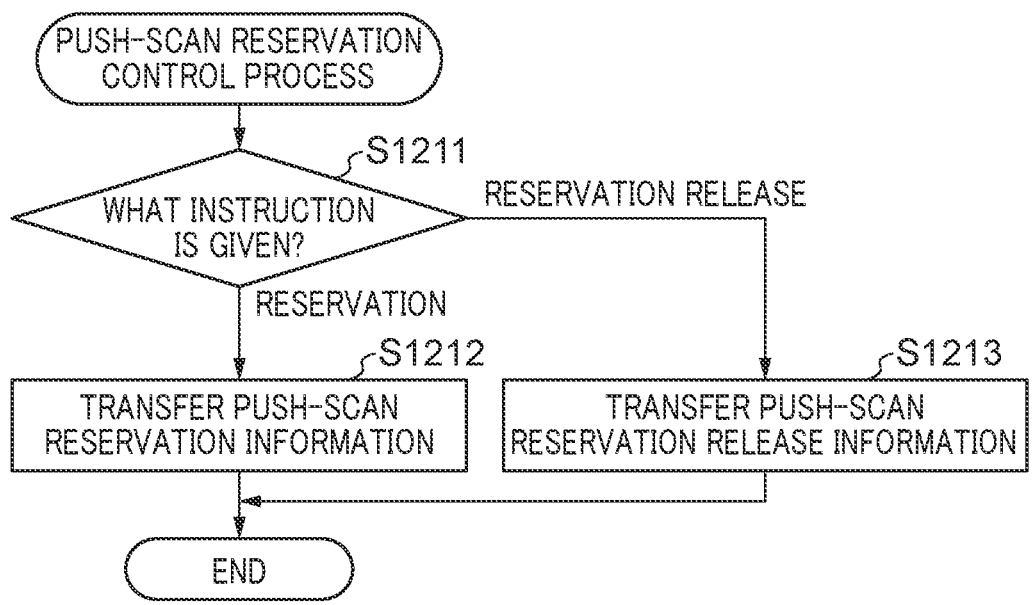
FIG. 12B is a flowchart showing a process executed in response to requests of S1104 and S1106 in FIG. 11.

FIG. 12B is a flowchart showing a push-scan reservation control process executed in response to the push-scan reservation instruction in S1104 or the push-scan reservation release instruction in S1106. Each process of the flowchart in FIG. 12B is achieved by the CPU 206 that functions as the scan reservation control module 434. Accordingly, the scan reservation control module 434 is described as the execution subject of each process of the flowchart in FIG. 12B.

In S1211, the scan reservation control module 434 checks a request content. When determining that the push-scan reservation instruction is received, the scan reservation control module 434 proceeds with the process to S1212. When determining that the push-scan reservation release instruction is received, the scan reservation control module 434 proceeds with the process to S1213. In S1212, the scan reservation control module 434 transfers the received push-scan reservation information to the image processing apparatus 105. In S1213, the scan reservation control module 434 transfers the received push-scan reservation release information to the image processing apparatus 105. When the process in S1212 or S1213 has been executed, the scan reservation control module 434 finishes this process.

Figure 12C:
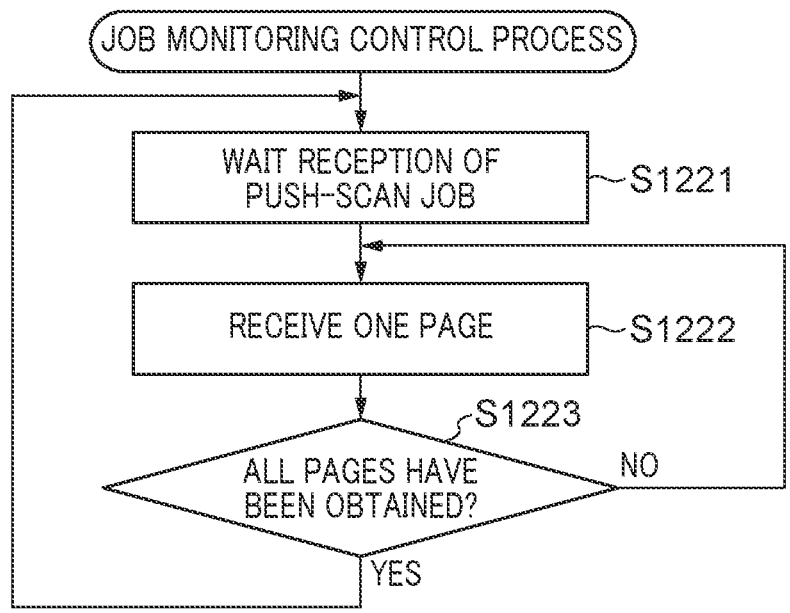
FIG. 12C is a flowchart showing a process executed in response to the process in S1202 in FIG. 12A.

FIG. 12C is a flowchart showing a job monitoring control process executed by the job monitoring module 431 started in S1202 in FIG. 12A. Each process of the flowchart in FIG. 12C is achieved by the CPU 206 that functions as the job monitoring module 431. Accordingly, the job monitoring module 431 is described as the execution subject of each process of the flowchart in FIG. 12C.

It should be noted that this embodiment assumes a work flow where the user transmits the push scan reservation to the image processing apparatus 105 from the information processing apparatus 104, goes to the image processing apparatus 105 with holding a document, sets the document, and performs the push scan. In this embodiment, since the push-scan reservation information does not include the timer value, the flowchart in FIG. 12C does not include the process corresponding to the route proceeding to S823 from S822 in the flowchart in FIG. 8C. Accordingly, although the subtraction start time, which is a variable managed on the ROM/RAM 207, is set to the current time in the first embodiment, such a process is not performed in the second embodiment. As a result, the processes in S1221, S1222, and S1223 are executed in the job monitoring control process of the flowchart in FIG. 12C. These are respectively identical to the processes in S821, S824, and S825 of the flowchart in FIG. 8C. Accordingly, detail descriptions about the processes in S1221, S1222, and S1223 are omitted.

Figure 13A:
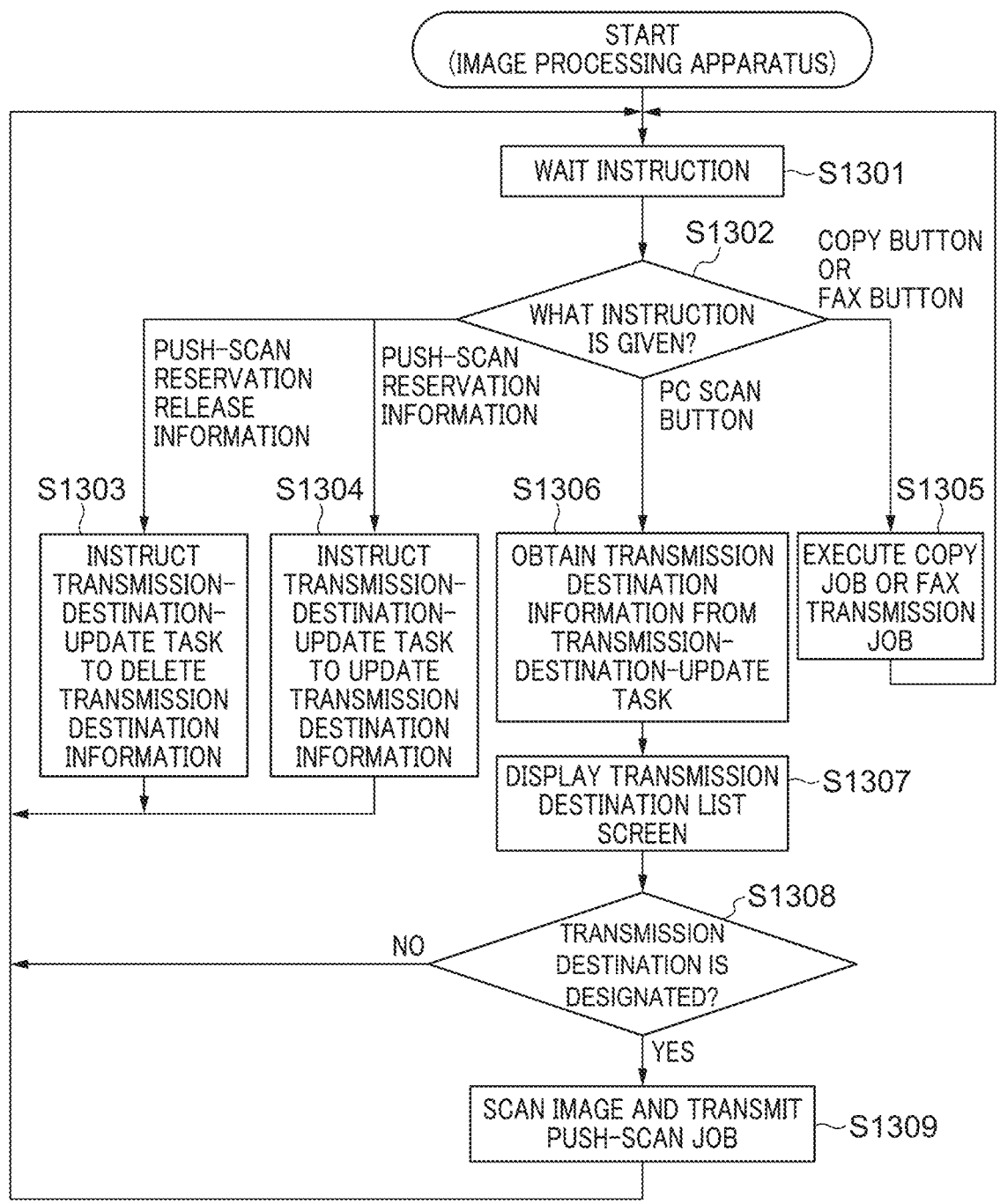
FIG. 13A is a flowchart showing a process that the image processing apparatus executes in performing the push scan job according to the second embodiment.

Next, the control executed in the image processing apparatus 105 is described. FIG. 13A is a flowchart showing the process executed in the image processing apparatus 105 in performing push scan control according to the second embodiment. Each process (step) indicated by an S-number of the flowchart in FIG. 13A is achieved because the CPU 306 develops the OS 422 stored in the external storage unit 312 onto the RAM of the ROM/RAM 307 and controls an operation of each part of the image processing apparatus 105. In the description, the OS 422 is described as an execution subject of each process (step) of the flowchart in FIG. 13A.

Also in the second embodiment, the image processing apparatus 105 is started as well as the first embodiment, and a transmission destination update task is started in association with the start of the image processing apparatus 105. Since the processes in S1301, S1302, S1304 through S1309 are identical to the processes in S901, S902, S903 through S908 of the flowchart in FIG. 9A (the control of the image processing apparatus 105 in the first embodiment), their descriptions are omitted.

When the OS 422 determines in S1302 that the push scan reservation release information is received, the OS 422 proceeds with the process to S1303. In S1303, the OS 422 instructs the transmission destination update task to delete the information about the information processing apparatus that has transmitted the push scan reservation release information from the transmission-destination information displayed on the display unit 313 on the basis of the push-scan reservation release information. The OS 422 returns the process to S1301 after the process in S1303 is completed.

Figure 13B:
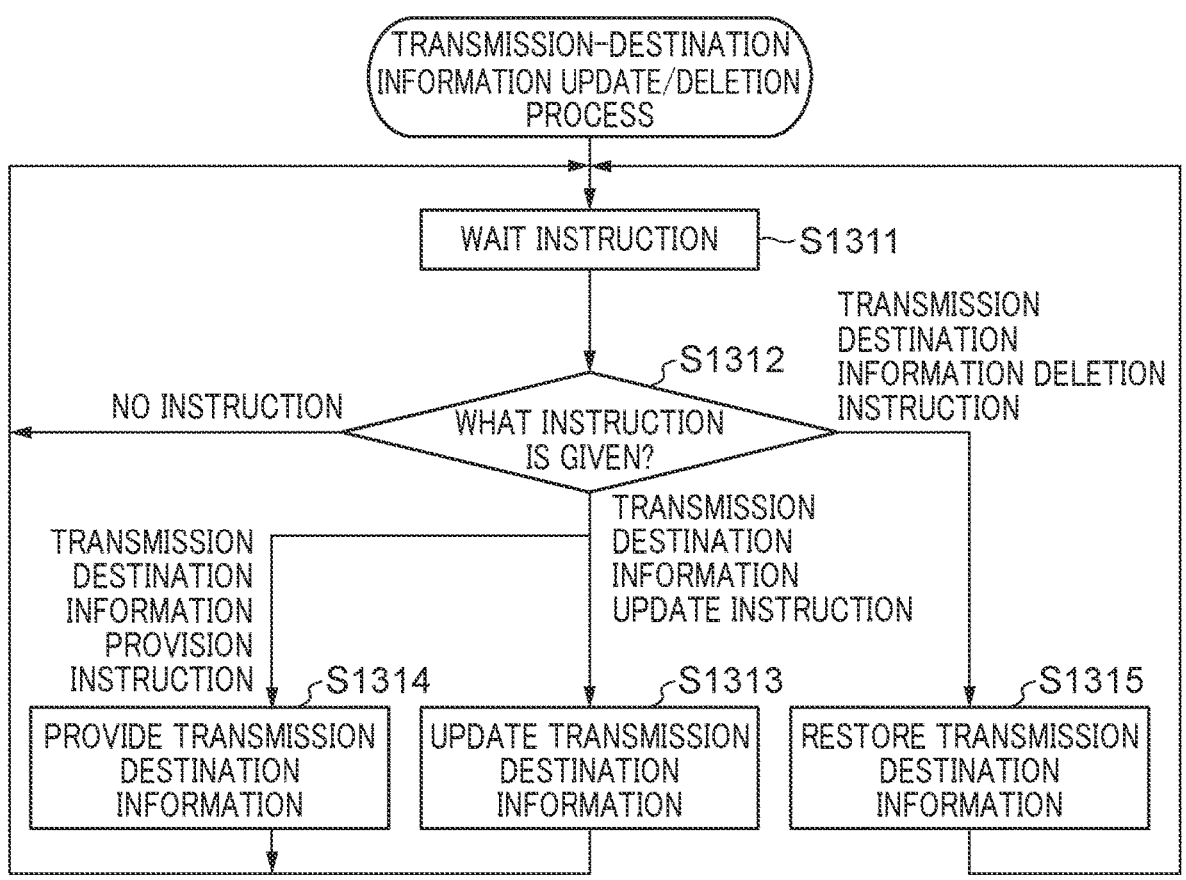
FIG. 13B is a flowchart showing a process executed in response to the processes in S1303 and S1304 in FIG. 13A.

Next, a transmission-destination information update/deletion process executed in response to the instruction in S1303 or S1304 will be described. FIG. 13B is a flowchart showing the transmission-destination information update/deletion process. As mentioned above, the transmission destination update task is automatically started, when the CPU 306 runs the OS 422 after the electric power is applied to the image processing apparatus 105. Accordingly, the transmission destination update task is described as an execution subject of each process (step) of the flowchart in FIG. 13B.

Since the process in S1311 is identical to the process in S911 of the flowchart in FIG. 9B (the control of the image processing apparatus 105 in the first embodiment), its description is omitted.

In S1312, the transmission destination update task determines the content of the instruction from the outside. When determining that there is no instruction from the outside, the transmission destination update task returns the process to S1311. That is, the transmission destination update task waits until receiving an instruction from the outside. When receiving the push-scan reservation information from the outside, the transmission destination update task determines that the transmission-destination information update process is designated and proceeds with the process to S1313. Since the process in S1313 is identical to the process in S913 in the flowchart in FIG. 9B, its description is omitted. Moreover, when determining that provision of the transmission-destination information is instructed because the PC scan button 1004 is pressed in the menu screen 1001, the transmission destination update task proceeds with the process to S1314. Since the process in S1314 is identical to the process in S915 in the flowchart in FIG. 9B, its description is omitted.

When determining that the push-scan reservation release information is received from the information processing apparatus 104, the transmission destination update task proceeds with the process to S1315. The process in S1315 is approximately identical to the process in S916 in the flowchart in FIG. 9B. That is, the transmission destination update task deletes the transmission-destination information currently held and restores the transmission-destination information being prior to the last update of S1313. That is, the transmission-destination information is restored according to a trigger that is the determination of whether the current time exceeds the timeout time in the first embodiment. In the meantime, the transmission-destination information is restored according to a trigger that is the reception of the push scan reservation release information in the second embodiment. The transmission destination update task returns the process to S1311 after S1315.

Also in the second embodiment, the job monitoring process that waits the push scan job by the information processing apparatus is not started automatically immediately after the electric power is applied to the information processing apparatus and is started only after the push scan reservation is performed as with the first embodiment. Then, since the information processing apparatus is running the job monitoring process even before performing the push scan from the image processing apparatus, the push scan job can be executed satisfactorily and can be completed.

Moreover, since the job monitoring process in the information processing apparatus can be manually stopped by a push-scan reservation release operation, the power saving of the information processing apparatus and the load reduction of the CPU 206 can be achieved. Furthermore, an icon of an information processing apparatus is displayed on the display unit 313 of the image processing apparatus as a push-scan transmission destination only in the period when the job monitoring process is running on the information processing apparatus. Thereby, an operation mistake by another person in selecting a transmission destination of a push scan job can be reduced.

Although the present invention has been described in detail on the basis of the suitable embodiments, the present invention is not limited to these specific embodiments. The present invention includes various configurations that do not deviate from the scope of the present invention. Furthermore, the above-mentioned embodiments show examples of the present invention and the embodiments can be combined suitably. For example, the timeout process of the timer time and the push-scan reservation release operation can be employed together as the means for stopping the job monitoring process in the information processing apparatus. In such a case, if the timer time is set to too long, unnecessary continuation of the job monitoring process can be released manually by the push-scan reservation release operation. Moreover, if the push-scan reservation release operation is forgotten, the job monitoring process is automatically released because the timer time is set.

The processes in S811 and S1212 of the scan reservation control module 434 of the information processing apparatus 104 are equivalent to a function of a first transmission unit that transmits identification information about the information processing apparatus 104 to the image processing apparatus 105. The processes in S824 and S1222 of the job monitoring module 431 are equivalent to a function of a reception unit that receives image data. The processes in S801, S1202, and S1203 by the start-finish control module 433 are equivalent to a function of a setting unit that sets as to whether image data is transmitted to a predetermined application. The process in S1213 by the scan reservation control module 434 is equivalent to a function of a third transmission unit that transmits a deletion instruction, which instructs deletion of the information about the information processing apparatus as the transmission destination of image data, to the image processing apparatus 105. The job monitoring module 431 is also bearing a function of a second transmission unit that transmits image data to a predetermined application.

The processes in S908 and S1309 by the OS 422 of the image processing apparatus 105 are equivalent to functions of a scanner unit and fourth transmission unit. The determinations in S907 and S1308 by the OS 422 are equivalent to the function of a control unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008886, filed Jan. 22, 2021, which is hereby incorporated by reference herein in its entirety.

What is claimed is:

1. An information processing apparatus that is communicable with an image processing apparatus, the information processing apparatus comprising:
a network interface device system;
a memory device system storing one or more programs; and
a data processing device system communicatively connected to the network interface device system and the memory device system and configured by the one or more programs at least to:
transmit, via the network interface device system, identification information about the information processing apparatus to the image processing apparatus;
receive, via the network interface device system, image data that is generated by scanning a document by the image processing apparatus and is transmitted from the image processing apparatus using the identification information;
transmit, via the network interface device system, the received image data to a predetermined application stored by the memory device system of the information processing apparatus;
set as to whether the received image data is transmitted to the predetermined application; and
transmit, via the network interface device system, a deletion instruction to the image processing apparatus,
wherein whether the received image data is transmitted to the predetermined application is set based on the transmitting of the identification information via the network interface device system, so that the received image data is transmitted to the predetermined application via the network interface device system,
wherein the deletion instruction instructs deletion of information about the information processing apparatus as a transmission destination of image data transmitted from the image processing apparatus, and
wherein the data processing device system is configured by the one or more programs at least to set so as to stop transmitting the received image data to the predetermined application at a timing at which the deletion instruction is transmitted to the image processing apparatus via the network interface device system.

2. The information processing apparatus according to claim 1, wherein the identification information includes a timer value that designates a predetermined period, and
wherein the data processing device system is configured by the one or more programs at least to set so as to stop transmitting the received image data to the predetermined application at a timing at which the predetermined period of the timer value elapses after the identification information is transmitted to the image processing apparatus via the network interface device system.

3. A control method for an information processing apparatus that is communicable with an image processing apparatus, the control method comprising:
a first transmission step of transmitting identification information about the information processing apparatus to the image processing apparatus;
a reception step of receiving image data that is generated by scanning a document by the image processing apparatus and is transmitted from the image processing apparatus using the identification information;
a second transmission step of transmitting the image data received in the reception step to a predetermined application;
a setting step of setting as to whether the image data received in the reception step is transmitted in the second transmission step to the predetermined application; and
a third transmission step of transmitting a deletion instruction to the image processing apparatus,
wherein in the setting step, it is set, based on transmission of the identification information in the first transmission step, so as to transmit the image data received in the reception step to the predetermined application,
wherein the deletion instruction instructs deletion of information about the information processing apparatus as a transmission destination of image data transmitted from the image processing apparatus, and
wherein in the setting step, it is set so as to stop transmitting the image data received in the reception step to the predetermined application at a timing at which the deletion instruction is transmitted in the third transmission step to the image processing apparatus.

4. A non-transitory computer-readable storage medium storing a control program causing a computer to execute a control method for an information processing apparatus that is communicable with an image processing apparatus, the control method comprising:
a first transmission step of transmitting identification information about the information processing apparatus to the image processing apparatus;
a reception step of receiving image data that is generated by scanning a document by the image processing apparatus and is transmitted from the image processing apparatus using the identification information;

a second transmission step of transmitting the image data received in the reception step to a predetermined application;

a setting step of setting as to whether the image data received in the reception step is transmitted in the second transmission step to the predetermined application; and a third transmission step of transmitting a deletion instruction to the image processing apparatus, wherein in the setting step, it is set, based on transmission of the identification information in the first transmission step, so as to transmit the image data received in the reception step to the predetermined application, wherein the deletion instruction instructs deletion of information about the information processing apparatus as a transmission destination of image data transmitted from the image processing apparatus, and wherein in the setting step, it is set so as to stop transmitting the image data received in the reception step to the predetermined application at a timing at which the deletion instruction is transmitted in the third transmission step to the image processing apparatus.

\* \* \* \* \*